US006107963A

United States Patent [19]

Ohmi et al.

[11] Patent Number: 6,107,963

[45] Date of Patent: Aug. 22, 2000

[54] ADAPTIVE ARRAY ANTENNA

[75] Inventors: Shinichiro Ohmi, Toyono; Hiroshi Oue, Neyagawa; Hideki Nakahara, Kyoto, all of Japan

[73] Assignee: Matsushita Electric Industrial Co., Ltd., Osaka-fu, Japan

[21] Appl. No.: 09/442,637

[22] Filed: Nov. 18, 1999

[30] Foreign Application Priority Data

Nov. 20, 1998 [JP] Japan .................................. 10-330682

[51] Int. Cl.[7] .......................................... G01S 3/16

[52] U.S. Cl. ................................ 342/383; 342/378

[58] Field of Search .......................... 342/378, 380, 342/382, 383

[56] References Cited

U.S. PATENT DOCUMENTS

| | | | |
|---|---|---|---|
| 5,218,359 | 6/1993 | Miamisono | 342/383 |
| 5,434,578 | 7/1995 | Stehlik | 342/383 |
| 5,929,811 | 7/1999 | Rilling | 342/380 |
| 5,966,095 | 10/1999 | Hiramatsu et al. | 342/383 |

FOREIGN PATENT DOCUMENTS

| | | |
|---|---|---|
| 09199927 | 7/1997 | Japan . |
| 10041732 | 2/1998 | Japan . |

*Primary Examiner*—Thomas H. Tarcza
*Assistant Examiner*—Dao L. Phan
*Attorney, Agent, or Firm*—Wenderoth, Lind & Ponack, L.L.P.

[57] ABSTRACT

An adaptive antenna includes a buffer for storing sample data obtained by sampling a receive signal, an information storage part for storing a plurality of sets of coefficients, an evaluation part for calculating an evaluation value of the result obtained by the coefficient and the sample data, a selection part for selecting two or more sets of coefficients in order of decreasing evaluation, an exchanging part for exchanging a part of coefficients between the selected sets of coefficients to generate a new set of coefficients, a changing part for changing a part of coefficients of the selected sets with random numbers to generate a new sets of coefficients, a reproduction part for reproducing the selected sets of coefficients as they are, and a determination part for outputting the result obtained by the set of coefficients with the highest evaluation value after the information storage part, the evaluation part, the selection part, the exchanging part, the changing part, and the reproduction part repeats respective operation once or more.

24 Claims, 24 Drawing Sheets

FIG. 7

INITIAL VALUE DATA

1

[DIRECTION -84.375 DEGREES]
-0.00661524512693+0.12482483139148i
0.00472625670028−0.12491061803387i
-0.00283618671352+0.12496782003750i
0.00094546769168−0.12499642431223i
0.00094546769168+0.12499642431223i
-0.00283618671352−0.12496782003750i
0.00472625670028+0.12491061803387i
-0.00661524512693−0.12482483139148i

2

[DIRECTION -73.125 DEGREES]
-0.05699668759283+0.11124916900114i
0.04147249797680−0.11791959935297i
-0.02519053587207+0.12243543973245i
0.00844830018869−0.12471417811910i
0.00844830018869+0.12471417811910i
-0.02519053587207−0.12243543973245i
0.04147249797680+0.11791959935297i
-0.05699668759283−0.11124916900114i

3

[DIRECTION -61.875 DEGREES]
-0.12038921930079+0.03363682321722i
0.10000697480521−0.07499069935872i
-0.06602007611701+0.10614306171156i
0.02305200079497−0.12285603468837i
0.02305200079497+0.12285603468837i
-0.06602007611701−0.10614306171156i
0.10000697480521+0.07499069935872i
-0.12038921930079−0.03363682321722i

⋮

16

[DIRECTION -84.375DEGREES]
-0.00661524512693−0.12482483139148i
0.00472625670028+0.12491061803387i
-0.00283618671352−0.12496782003750i
0.00094546769168+0.12499642431223i
0.00094546769168−0.12499642431223i
-0.00283618671352+0.12496782003750i
0.00472625670028−0.12491061803387i
-0.00661524512693+0.12482483139148i

ADAPTIVE ARRAY ANTENNA

BACKGROUND OF THE INVENTION

1. Field of the Invention

The present invention relates to fast adaptive control over an array antenna, and more specifically, to fast adaptive control over an array antenna using a so-called genetic algorithm.

2. Description of the Background Art

An adaptive array antenna is an antenna including a plurality of antenna elements, which eliminates unwanted signals by applying appropriate weights to signals from the antenna elements and then combining the weighted signals. Outputs from the antenna elements are shifted in amplitude and phase and then combined to vary the antenna's directivity.

FIG. 22 is a block diagram showing the structure of a conventional adaptive array antenna. In FIG. 22, the adaptive array antenna includes a weighting part 4 for applying a predetermined weight to signals from the array antenna constructed of a plurality of antennas, a weighting control part 5 for controlling the weights in the weighting part 4, and a summer 6 for combining the weighted signals from the weighting control part 5.

Receive signals in the array antenna are inputted to the weighting part 4 and the weighting control part 5. The weighting control part 5 calculates the weights for varying the antenna's directivity so as to receive only a desired wave with highest sensitivity. The calculated weights are inputted to the weighting part 4.

The weighting part 4 applies the weight to each inputted signal. The weighted signals are combined by the summer 6 and then outputted.

In such adaptive array antenna, the algorithm used in the weighting control part 5 for calculating the weights so as to receive only a desired wave with highest sensitivity is an important factor. A typical algorithm includes LMS (Least Mean Squares) and RLS (Recursive Least Squares), both conventionally used, which are described below.

The LMS algorithm uses an instantaneous estimate of gradient based on an input (receive) vector and a sample value of an error signal. In LMS, the operation required for renewing a weight once is given by $$w(n)=w(n-1)+\mu u(n)e^*(n)$$

$$e(n)=d(n)-w^H(n-1)u(n) \qquad (1)$$

where w is the weight vector, u is the receive vector representing data sets for the antenna elements, d is the training signal, e is the error signal, * is complex conjugate, H is complex conjugate transpose, and n is the renewal number.

FIG. 23 is a block diagram showing the structure of the adaptive array antenna for realizing the operation of the above equations (1).

On the other hand, the RLS algorithm finds, unlike LMS, an inverse matrix of a correlation vector. In RLS, the operation required for renewing a weight once is given by $$w(n)=w(n-1)+k(n)e^*(n) \qquad (2)$$

$$k(n)=\frac{P(n-1)u(n)}{\lambda+u^H(n)P(n-1)u(n)}$$

-continued $$P(n)=\frac{P(n-1)-k(n)(P(n-1)u(n))^H}{\lambda}$$

$$e(n)=d(n)-w^H(n-1)u(n)$$

where k and P are the vectors.

FIG. 24 is a block diagram showing the structure of the adaptive array antenna for realizing the operation of the above equations (2).

In comparison, LMS requires less amount of operation but with lower accuracy, while RLS requires more amount of operation with higher accuracy. To compare the amounts of operation required for weight renewal processing, assume that the number of antenna elements is 8, and each amount of operation for addition and subtraction for 16 bits is 1. The amounts of operation for 16 bits are 16 for multiplication and 32 (16×2=32) for division. The amounts of operation for the complex number are: 2 for addition and subtraction each; 66 (16+16+1+16+16+1=66) for multiplication; and 132 (66×2=132) for division.

First, for LMS, in the above equations (1), the amounts of operation are 546 (2+(66+2)×8=546) for e(n), 800 ((2+66+16+16)—8=800) for w(n), and 1346 (546+800=1346) in total.

Next, for RLS, in the above equations (2), the amounts of operation are: 5953 (8×8×(66+2)+8×(66+2)+1+8×132=5953) for k(n), 4352 (8×8×66+8×8×2=4352) for P(n), 546 (2+(66+2)×8=546) for e(n), and 544 (8×(66+2)=544) for w(n), and 11395 (546+5953+4352+544=11395) in total.

Therefore, the amount of operation in LMS is less than 12% of that in RLS, allowing fast data communications.

For example, consider that an adaptive array antenna is used in a radio LAN using a frequency band of 2.4 GHz. In such radio LAN, a typical symbol rate is 10 MHz. Since the response rate required for weighting in the adaptive array antenna is approximately ten times the symbol rate, the adaptive array antenna is required to have the response rate of approximately 100 MHz. In view of performance of the available hardware, however, it is very difficult to achieve such fast response through RLS. Therefore, LMS has been widely used for adaptive array antennas.

LMS, however, uses an instantaneous estimate of gradient, resulting in low accuracy in solution because solution may be corrected in an erroneous direction due to noise, despite small amount of operation. Further, the convergence rate to solution is lower compared to RLS. Thus, when fast response is required as in the above described radio LAN, weights have to be calculated before convergence to solution, and as a result accuracy in solution becomes low.

FIG. 25 is a graph showing a convergence rate to solution in an adaptive array antenna using the LMS algorithm. In FIG. 25, a dotted line represents a desired wave, a one-dot-chain line represents the allowable noise level to the desired wave, and other three lines represent interference waves. Referring to FIG. 25, the levels of all interference waves are not more than the noise level to the desired wave when the number of iterations of operation is 75 or more, which means a convergence to solution is slow.

SUMMARY OF THE INVENTION

Therefore, an object of the present invention is to provide an adaptive array antenna capable of adaptive control with small amount of operation and high accuracy within a short period of time through the use of a so-called genetic algorithm, in which convergence to solution is faster than in the LMS algorithm.

The present invention has the following features to achieve the object above.

A first aspect of the present invention is directed to an adaptive array antenna for varying directivity by weighting receive signals so as to remove an undesired signal from the receive signals, which includes a plurality of array antenna elements for receiving signals; a weighting control part for receiving the signals from the plurality of array antenna elements, and calculating weight information including a plurality of element weights for use in weighting the receive signals so as to remove the undesired signal; a weighting part for receiving the weight information from the weighting control part, and weighting the signals from the plurality of array antenna elements; and a summer for combining all signals from the weighting part, and the weighting control part includes: a buffer for storing sample data obtained by sampling the signals from the plurality of array antenna elements; an evaluation part for performing array combining operation by multiplying the sample data by each of a plurality of possible weight information for each component corresponding to each of the array antenna elements and combining multiplication results, and for calculating an evaluation value representing a degree of removal of the undesired signal by the possible weight information from each of combined results; a selection part for selecting some of the plurality pieces of possible weight information in order of decreasing degree of evaluation; an exchanging part for exchanging one or more element weights included the selected plurality pieces of possible weight information to generate new possible weight information; a changing part for changing one or more element weights included in the selected plurality pieces of possible weight information with a random number to generate new possible weight information; a reproduction part for copying the selected weight information to generate new possible weight information: an information storage part for storing the possible weight information generated by the exchanging part, the changing part, and the reproduction part, and supplying the possible weight information to the evaluation part; and a determination part for calculating the weight information from the possible weight information with a most effective evaluation value among the selected possible weight information; wherein of the plurality pieces of possible weight information, only the plurality pieces of possible weight information with which the undesired signal can be removed more effectively are selected, exchanged, changed, reproduced, and reevaluated repeatedly for a predetermined number of times so as to be renewed from an initial state, and then only the possible weight information with which the undesired signal can be removed most effectively is determined as the weight information by the determination part.

In the first aspect, each element weight is renewed with simple non-linear operation such as exchanging, changing, reproduction, and selection. The amount of operation can thus be reduced compared to an inverse matrix operation or the like. Further, search can be performed in the vicinity of the present search point by exchanging, and the points a little distant from the present search point are searched by changing, thereby avoiding local solution. Search points then converge by selection, and repeating these operations allows improvement in accuracy of the optimum solution.

According to a second aspect, in the first aspect, the information storage part has the plurality pieces of possible weight information each of which is predetermined to have different directivities in the initial state, and supplies the plurality pieces of possible weight information to the evaluation part before the receive signals are supplied.

In the second aspect, search can be started with the loaded weight information in the vicinity of the optimum solution, thereby allowing reduction in search iterations and the amount of operation.

According to a third aspect, in the first aspect, the information storage part stores the weight information previously used corresponding to each of a plurality of transmitting stations, and when the transmitting station is changed, loads the weight information stored therein corresponding to the transmitting station at present as new possible weight information.

In the third aspect, search can be performed in the vicinity of the previous optimum solution even though the signal transmitting station is changed, thereby allowing reduction in search iterations and the amount of operation.

According to a fourth aspect, in the first aspect, the array antenna elements are structured by combining a plurality of sets of two array antenna elements arranged symmetrically in line with respect to a predetermined origin; the information storage part, the selection part, the exchanging part, the changing part, and the reproduction part use the possible weight information including only the element weights corresponding to one of the two array antenna elements in the set, and the evaluation part and the determination part use the possible weight information including the element weights corresponding to one of the two array antenna elements and further including values having a complex conjugate relation therewith as new element weights.

In the fourth aspect, the volume of data is reduced by half, thereby reducing operation for search and improving accuracy.

According to a fifth aspect, in the first aspect, each of the array antenna elements is arranged on coordinates of a combination of any of a plurality of X-coordinates and Y-coordinates on an X-axis and a Y-axis orthogonal to each other at a predetermined origin and a corresponding plurality of X-coordinates and Y coordinates having a conjugate complex relation therewith, the information storage part, the selection part, the exchanging part, the changing part, and the reproduction part use the possible weight information including only values of the plurality of X-coordinates and Y-coordinates on the X-axis and the Y-axis as the element weights, and the evaluation part and the determination part use the possible weight information including all values obtained by multiplying every X-coordinate value by every Y-coordinate value, the X-coordinate and Y-coordinate values arbitrarily selected from the values of said plurality of X-coordinates and Y-coordinates and the corresponding plurality of X-coordinates and Y-coordinates having the conjugate complex relation therewith so that combinations of the X-coordinate and Y-coordinate values vary one another, as the element weights.

In the fifth aspect, the volume of data is reduced by one quarter, thereby reducing operation for search and improving accuracy.

According to a sixth aspect, in the first aspect, the changing part adds a random number generated in a predetermined range to one or more element weights included in the selected plurality of pieces of weight information, and generates new possible weight information.

In the sixth aspect, the next search point is determined based on the present search point, thereby allowing peripheral search within a predetermined range.

According to a seventh aspect, in the sixth aspect, the changing part changes the range of random numbers to be generated under predetermined condition.

In the seventh aspect, the range of search can vary, thereby allowing control of search accuracy.

According to an eighth aspect, in the seventh aspect, the changing part changes the range of random numbers to be narrower as the evaluation value is higher, and to be broader as the evaluation value is lower.

In the eighth aspect, it is possible to improve search accuracy more as solutions are converging to the optimum solution.

According to a ninth aspect, in the seventh aspect, the changing part changes the range of random numbers so as to be narrower as the number of operations by the information storage part, the evaluation part, the selection part, the exchanging part, the changing part, and the reproduction part is larger, and to be broader as the number of operation is smaller.

In the ninth aspect, it is possible to improve search accuracy more as solutions are converging to the optimum solution by iterations of operation.

According to a tenth aspect, in the first aspect, the evaluation part finds a squared error between a distance from signal point coordinates calculated from the result of the array combining operation to an origin and a predetermined value, and calculates a higher evaluation value as the squared error is lower.

In the tenth aspect, signal points are collected on the circumference of a circle centering on the origin with its radius predetermined, to separate interference waves. Therefore, the element weight for extracting only the desired signal can be obtained.

According to an eleventh aspect, in the first aspect, the evaluation part finds a distance between signal point coordinates calculated from the result of the array combining operation and signal point coordinates at transmission, and calculates a higher evaluation value as the distance is shorter.

In the eleventh aspect, signal points are collected on the signal point coordinates to separate interference waves. Therefore, the element weight for extracting only the desired signal with frequency synchronization can be obtained.

According to a twelfth aspect, in the first aspect, the evaluation part has signal point coordinates for training in advance, finds a distance between signal point coordinates calculated from the result of the array combining operation and the signal point coordinates for training, and calculates a higher evaluation value as the distance is shorter.

In the twelfth aspect, at training, signal points are collected on only the signal point coordinates for training to separate interference waves with high accuracy. Therefore, the element weight for extracting only the desired signal with high accuracy can be obtained.

According to a thirteenth aspect, in the first aspect, the evaluation part finds a distance between signal point coordinates in which real and imaginary components of the signal point coordinates calculated from the result of the array combining operation are taken as positive and signal point coordinates in a first quadrant at transmission, and calculates a higher evaluation value as the distance is shorter.

In the thirteenth aspect, signal points converted into positive values are collected on the signal point coordinates in the first quadrant to separate interference waves. Therefore, the element weight for extracting only the desired signal with frequency synchronization can be obtained with simple evaluation and reduced amount of operation.

According to a fourteenth aspect, in the thirteenth aspect, when a plurality of signal point coordinates are present in the first quadrant at transmission, the evaluation part finds each squared error between an absolute value of the real component of the signal point coordinates calculated from the result of the array combining operation and each of the real component of the plurality of signal point coordinates, and multiplies all squared errors; finds each squared error between an absolute value of the imaginary component of the signal point coordinates calculated from the result of the array combining operation and each of the imaginary component of the plurality of signal point coordinates; multiplies all squared errors; and calculates a higher evaluation value as a value obtained by combining the multiplied squared errors is smaller.

In the fourteenth aspect, each signal point is collected on any one of the plurality of signal point coordinates in the first quadrant to separate interference waves. Therefore, evaluation can be performed even with the plurality of signal point coordinates, and the element weight for extracting only the desired signal with frequency synchronization can be obtained.

According to a fifteenth aspect, in the first aspect, the evaluation part performs the array combining operation for each of plurality of pieces of sample data with different sample timings, and calculates the evaluation value by combining a plurality of results of the array combining operation.

In the fifteenth aspect, obtained is the evaluation value obtained by time-averaging the sum of the evaluations of the plurality of signal points, thereby allowing reduction in adverse effects due to noise and the like and allowing evaluation with high accuracy.

According to a sixteenth aspect, in the first aspect, the determination part calculates the weight information from the possible weight information with a second-highest evaluation value among the selected plurality of pieces of possible weight information.

In the sixteenth aspect, by avoiding the first-ranked evaluation value, it is possible to reduce the risk of selecting the weight information erroneously evaluated highly due to noise.

According to a seventeenth aspect, in the first aspect, the exchanging part fixes the element weights to be exchanged to values corresponding to any predetermined one of the antenna elements.

In the seventeenth aspect, specific element weights are exchanged, thereby allowing the range of search in exchanging processing to be narrowed.

According to an eighteenth aspect, in the first aspect, the exchanging part determines the element weights to be exchanged at random.

In the eighteenth aspect, it is possible to broaden the range of search in exchanging processing.

According to a nineteenth aspect, in the first aspect, the exchanging part fixes ranks of the evaluation values corresponding to the weight information including the element weights to be exchanged to a predetermined set of the ranks.

In the nineteenth aspect, the weight information can be exchanged according to the evaluation rank, thereby allowing search with certain characteristics.

According to a twentieth aspect, in the first aspect, the exchanging part randomly determines ranks of the evaluation values corresponding to the weight information including the element weights to be exchanged.

In the twentieth aspect, it is possible to broaden the range of search in exchanging processing.

According to a twenty-first aspect, in the first aspect, the exchanging part exchanges either real components or imaginary components of the element weights.

In the twenty-first aspect, it is possible to perform fine search in exchanging processing to improve accuracy of convergence to the optimum solution.

According to a twenty-second aspect, in the first aspect, the changing part changes either real components or imaginary components of the element weights with a random number.

In the twenty-second aspect, it is possible to perform fine search in changing processing to improve accuracy of convergence to the optimum solution.

According to a twenty-third aspect, in the first aspect, the evaluation part calculates the evaluation values of the plurality of pieces of possible weight information in parallel operation.

In the twenty-third aspect, it is possible to make operation in the evaluation part faster.

According to a twenty-fourth aspect, in the first aspect, the weight information includes the plurality of element weights corresponding to the array antenna elements and further a rotator for providing a restriction to phase rotation for the plurality of element weights as the element weight, and the evaluation part performs the array combining operation by multiplying the sample data by the possible weight information for each component corresponding to each of the array antenna elements, then multiplying each of multiplication results by the rotator and combining multiplication results.

In the twenty-fourth aspect, adjustments to phase rotation is not required for demodulation. Further, the use of the element weights with a restriction allows weighting with higher accuracy than those without any restriction.

These and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a diagram showing exemplary weight information in an initial state;

DESCRIPTION OF THE PREFERRED EMBODIMENTS (First Embodiment)

Figure 1:
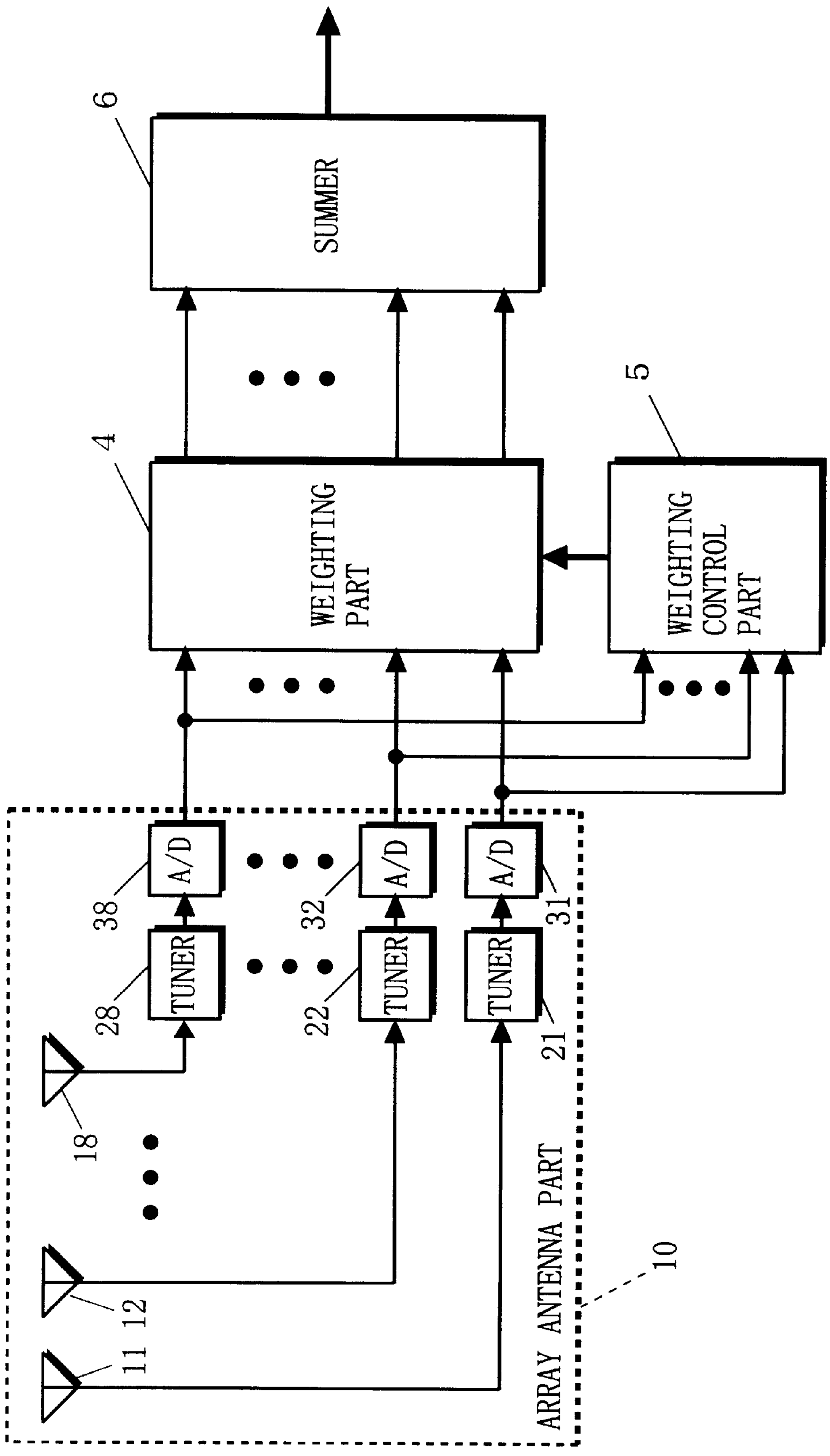
FIG. 1 is a schematic diagram showing the structure of an adaptive array antenna of one embodiment of the present invention.
Figure 2:
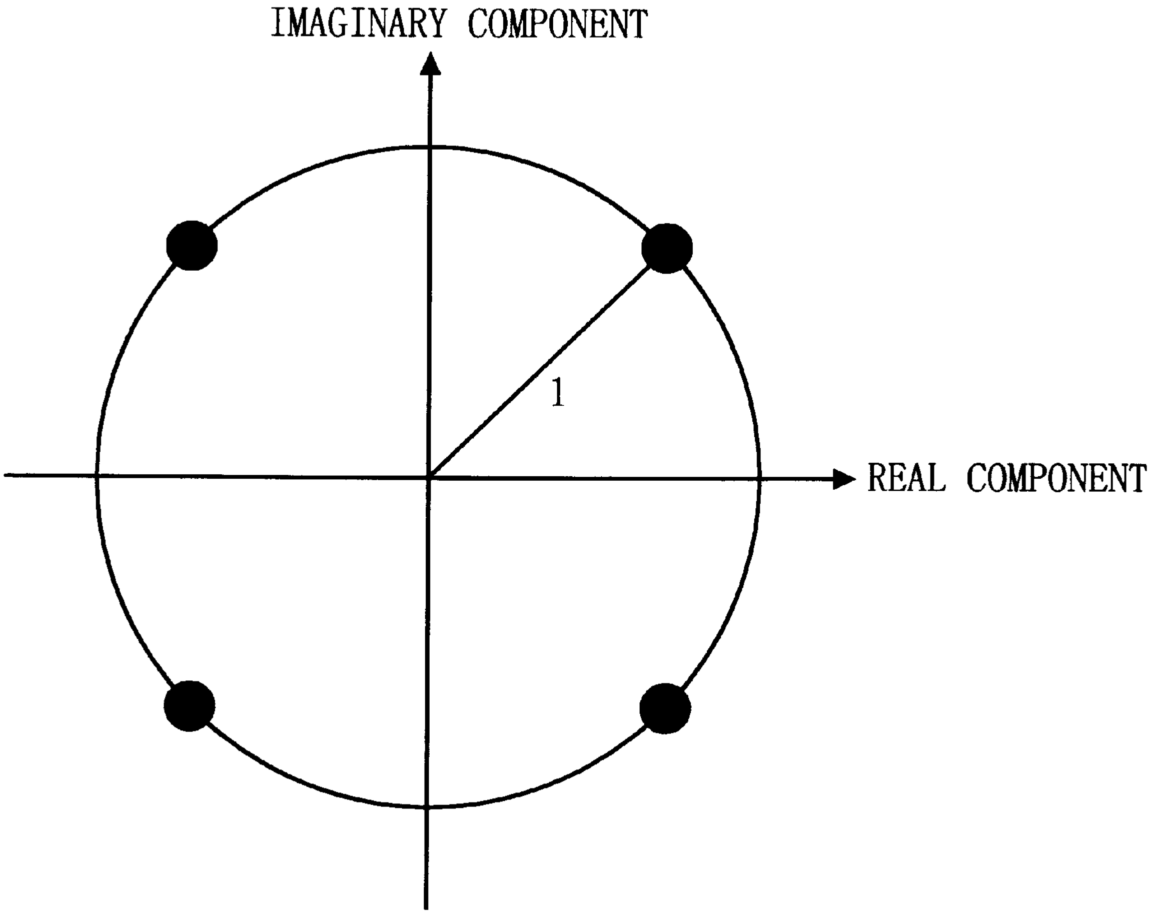
FIG. 2 is a diagram showing signal point coordinates in quaternary phase shift keying (QPSK)
Figure 3:
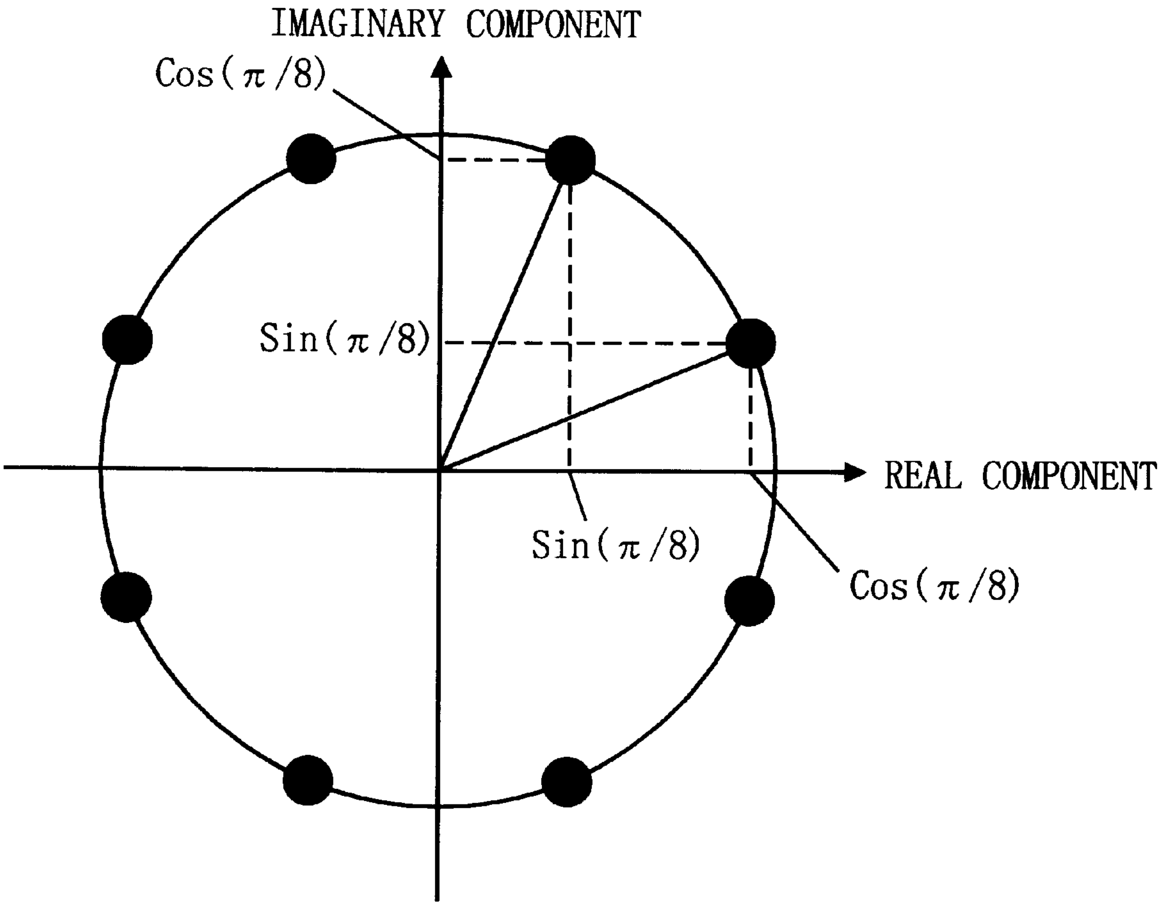
FIG. 3 is a diagram showing signal point coordinates in octonary phase shift keying.

Referring to FIG. 1, described is an adaptive array antenna according to a first embodiment. Note that signals received by the adaptive array antenna of the present invention are modulated/demodulated with quaternary phase shift keying (hereinafter, QPSK) or octonary phase shift keying (hereinafter, octonary PSK). The signal point coordinates at transmission in QPSK can be illustrated in FIG. 2, while those in octonary PSK in FIG. 3. In FIGS. 2 and 3, black marks represent signal points, the vertical axis represents the real component, and the lateral axis represents the imaginary component.

In FIG. 1, the adaptive array antenna includes an array antenna part 10 for receiving signals, a weighting part 4 for applying a predetermined weight to each of eight signals from the array antenna part 10, a weighting control part 5 for providing weight applied in the weighting part 4, and a summer 6 for combining 8 signals from the weighting control part 5.

The array antenna part 10 includes eight antenna elements 11 to 18, eight tuners 21 to 28 provided corresponding to the antenna elements 11 to 18, and eight A/D converters 31 to 38 provided corresponding to the tuners 21 to 28.

As described above, the adaptive array antenna according to the first embodiment is structured so as to weight signals from eight antenna elements 11 to 18. The number of antenna elements, however, is not restricted to eight as long as it is two or more, and the arrangement of the array elements may take another form.

Described next is operation of the adaptive array antenna. Signals are received by eight antenna elements 11 to 18. Each receive signal is down-converted from a radio frequency to a base-band signal by the corresponding eight tuners 21 to 28. Each down-converted signal is converted from analog to digital by the corresponding A/D converters 31 to 38, and outputted therefrom as sample data.

The sample data is supplied to the weighting part 4 and the weighting control part 5. The weighting control part 5 is provided with the sample data to calculate element weights for varying directivity of the antenna so as to receive only a desired wave with highest sensitivity. The calculated eight element weights are collected as one set of weight information and supplied to the weighting part 4. Thus, the weight information referred herein is a data set including a plurality of element weights.

The weighting part 4 weights the inputted sample data using eight element weights included in the weight information. The weighted signals are all combined by the summer 6, and outputted therefrom.

Figure 4:
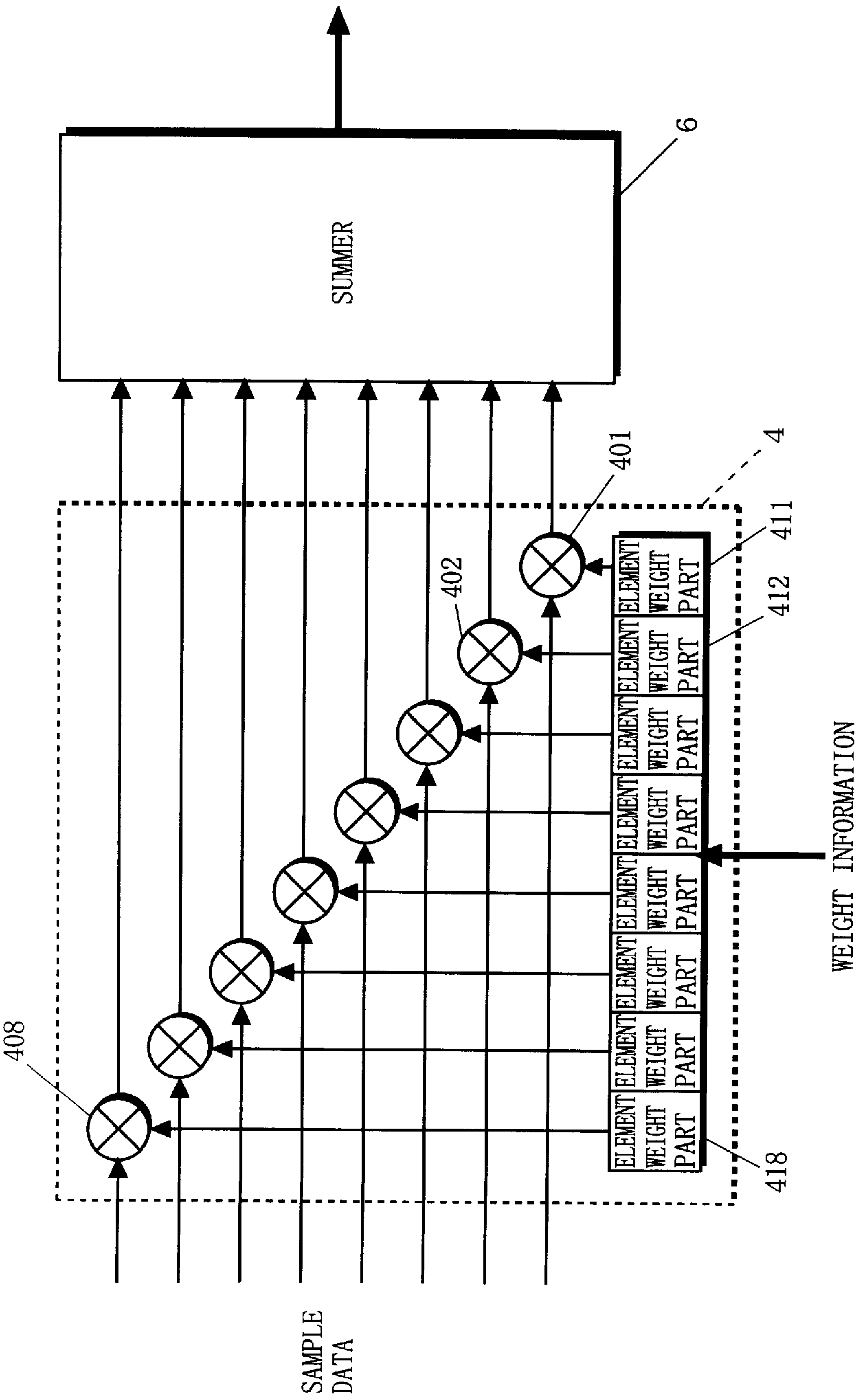
FIG. 4 is a schematic diagram showing the structure for array combining operation.

Referring to FIG. 4, operation of the weighting part 4 and the summer 6 is now described in detail. The weighting part 4 includes eight multipliers 401 to 408 and eight element weight parts 411 to 418. Each of eight element weight parts 411 to 418 is provided with the weight information, and outputs the element weight corresponding to each sample data. Each of the eight multipliers 401 to 408 multiplies the corresponding sample data by the element weight supplied from the corresponding element weight part. The summer 6 combines eight values obtained by multiplication, and the obtained value is outputted as an arithmetic result for one sample. This operation is herein called array combining operation.

In the first embodiment, 16 pieces of weight information are provided. Each weight information includes 8 element weights. Such weight information can be represented as W[k][m], where k is the weight information number, which is a natural number of 16 or less; and m is the weight number, which is a natural number of 8 or less.

Figure 5:
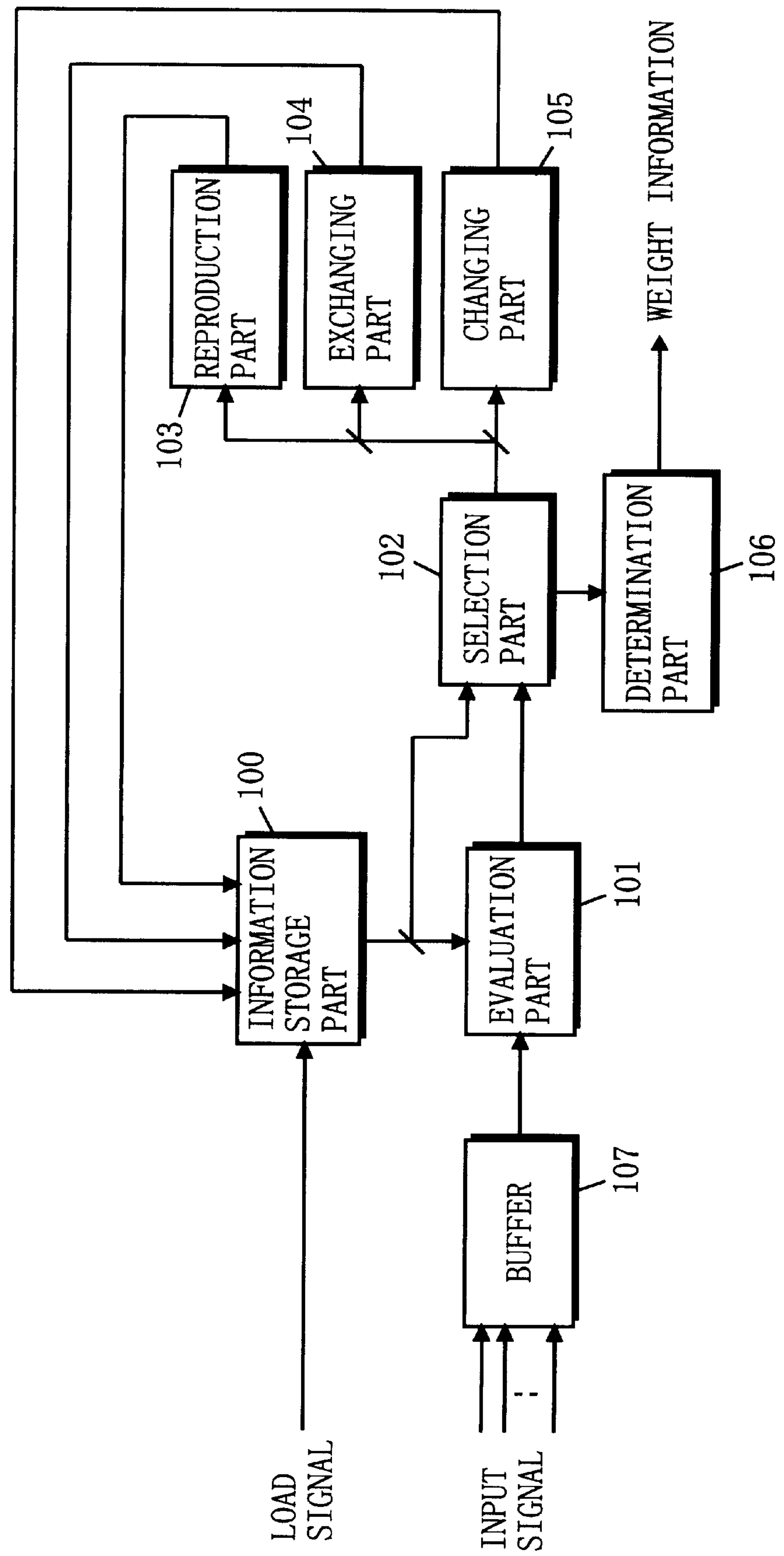
FIG. 5 is a schematic diagram showing the structure of a weighting control part 5 in detail.

FIG. 5 is a block diagram showing the detailed structure of the weighting control part 5. The weighting control part 5 includes: a buffer 107 for receiving eight signals; an evaluation part 101 for receiving signals from the buffer 107 and calculating optimal weights to receive a desired signal; a selection part 102 for selecting possible weights with a high evaluation value; a reproduction part 103 for copying the values supplied by the selection part 102, an exchanging part 104 for exchanging part of the values supplied by the selection part 102; a changing part 105 for changing part of the values supplied by the selection part 102; an information storage part 100 for storing values calculated by the reproduction part 103, the exchanging part 104, and the changing part 105; and a determination part 106 for calculating weights from the values supplied by the selection part 102.

Figure 6:
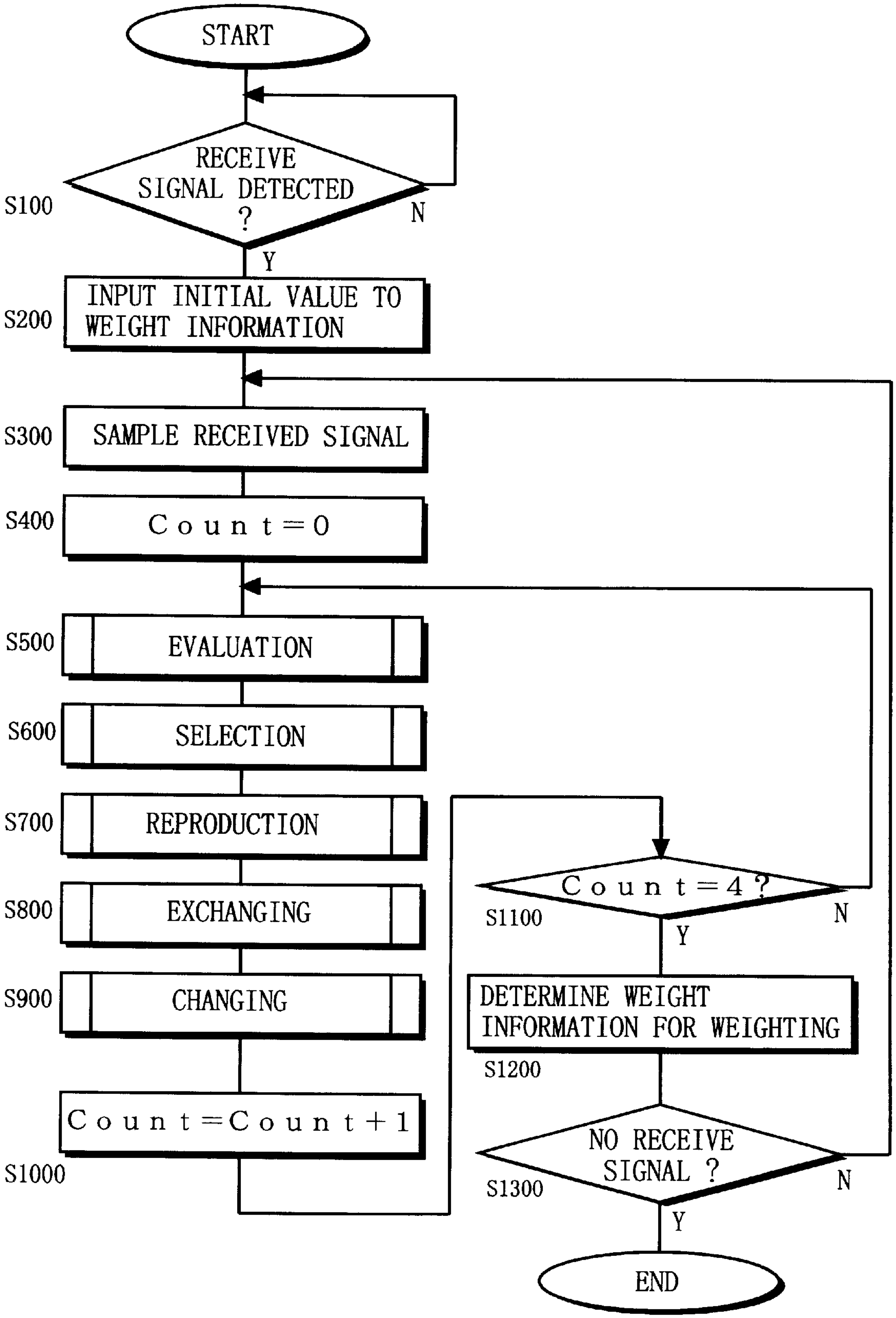
FIG. 6 is a flow chart showing operation of the weighting control part 5 in a first embodiment of the present invention.

Referring to FIG. 6, operation of the weighting control part 5 is now described. In step S100, the information storage part 100 keeps a wait state until a load signal showing that a receive signal is detected is supplied thereto. The load signal is outputted by a timing detector (not shown) when a receive signal is detected.

When the load signal showing a receive signal is detected is supplied, the information storage part 100 inputs initial values to the weight information (step S200). Although the initial value may be 0, it is preferred that the weight information be as shown in FIG. 7, previously calculated so as to have 16 different directivities. With such weight information, search can be started from nearly optimum solutions, allowing reduction in search iterations and, as a result, reduction in the amount of operation.

In a case of a plurality of transmitting terminals, the information storage part 100 may be provided with the terminal number of the transmitting terminal which is about to transmit as a load signal (step S100). In such configuration, the timing detector (not shown) detects the transmitting terminal which is about to transmit from among the plurality of transmitting terminals managed in predetermined timing. The timing detector produces a load signal of the detected terminal number.

Supplied with the load signal, the information storage part 100 supplies the initial values to the weight information (step S200). The initial values to be supplied are preferably the weight information for previous transmission stored for each terminal number. With such weight information, search can be started from previous nearly-optimum solutions even when the transmitting terminal is changed, thereby allowing reduction in search iterations and, as a result, in the amount of operation.

In step S300, the buffer 107 samples eight signals received from the antenna elements eight times as fast as the symbol rate. The buffer 107 stores sample data for 4 symbols, that is, 32*8 sample data. The stored sample data is represented by S[n][m], where n is the sample number, which is a natural number of 32 or less; and m is the element number, which is a natural number of 8 or less.

In step S400, the determination part 106 substitutes 0 into a variable Count for counting the number of processings in steps S500 and thereafter, and the procedure advances to subroutine step S500.

Figure 8:
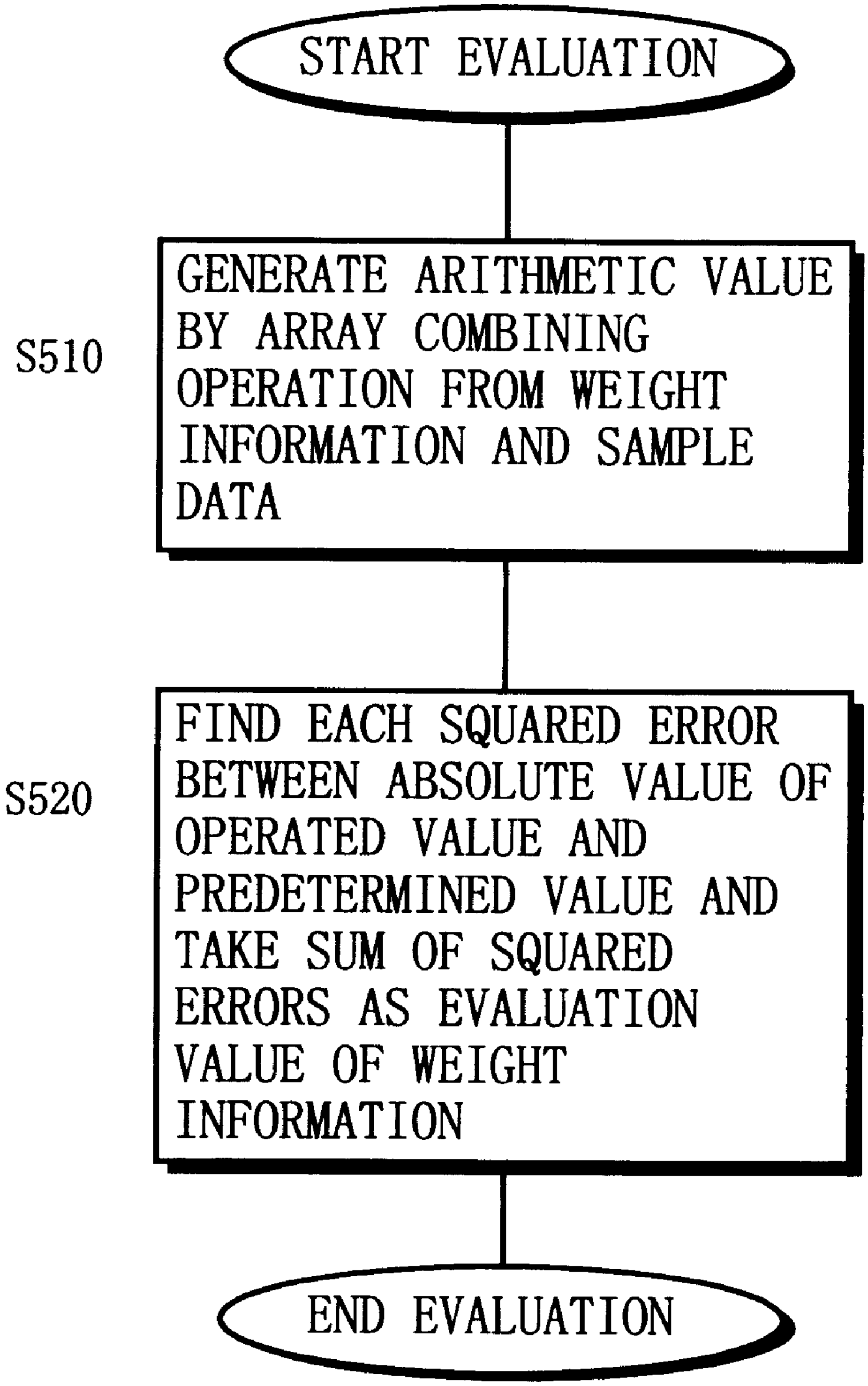
FIG. 8 is a flow chart showing detailed processing in subroutine step S500 (evaluation) in FIG. 6.

FIG. 8 is a flow chart showing processing in subroutine step S500 (evaluation) in detail. Referring to FIG. 8, operation of the evaluation part 101 in QPSK is now described. As described above, signal point coordinates at transmission is shown in FIG. 2.

In step S510, the evaluation part 101 is provided with data from the buffer 107 and the information storage part 100, and performs operation given by $$P[k] = \sum_{n=1}^{32}\left(\left|\sum_{m=1}^{8}(S[n][m] \times W[k][m])\right| - 1\right)^2 \tag{3}$$

As the above equation (3), the evaluation part 101 first multiplies the sample data S[n][m] by the weight information W[k][m] stored in the information storage part 100. The multiplication is the above described array combining operation shown in FIG. 4.

Next, in step S520, the evaluation part 101 generates an absolute value of the arithmetic result in the above array combining operation. The absolute value represents a distance from the origin of a signal point. The evaluation part 101 finds the squared error (squared difference) between the generated absolute value and 1 representing a certain amplitude. The evaluation part 101 combines all evaluation values, and ends the operation. The evaluation value can be represented by P[k], where k is the weight information number, as described above.

In this way, with constant amplitude of the modulated signal in QPSK, the evaluation part 101 calculates a shift of the amplitude value of the sample data from a predetermined amplitude value as an evaluation value. The evaluation value is calculated for each of 16 pieces of weight information. Therefore, the evaluation part 101 finds 16 evaluation values.

Referring to FIG. 8, operation of the evaluation part 101 in octonary PSK is described. As described above, signal point coordinates at transmission are shown in FIG. 3.

In step S510, supplied with data from buffer 107 and the information storage part 100, the evaluation part 101 performs operation given by $$I1[k][n]=\left(\left|\mathrm{real}\left(\sum_{m=1}^{8}(S[n][m]\times W[k][m])\right)\right|-\cos(\pi/8)\right)^2 \quad (4)$$

$$I2[k][n]=\left(\left|\mathrm{real}\left(\sum_{m=1}^{8}(S[n][m]\times W[k][m])\right)\right|-\sin(\pi/8)\right)^2$$

$$Q1[k][n]=\left(\left|\mathrm{imag}\left(\sum_{m=1}^{8}(S[n][m]\times W[k][m])\right)\right|-\cos(\pi/8)\right)^2$$

$$Q2[k][n]=\left(\left|\mathrm{imag}\left(\sum_{m=1}^{8}(S[n][m]\times W[k][m])\right)\right|-\sin(\pi/8)\right)^2$$

$$P[k]=\sum_{n=1}^{32}((I1[k][n]\times I2[k][n])+(Q1[k][n]\times Q2[k][n]))$$

where real means extraction of the real component, and imag means extraction of the imaginary component.

In the equations (4), the evaluation part 101 performs the above described array combining operation as shown in FIG. 4 using S[n][m] and the weight information stored in the information storage part 100 to generate an arithmetic value.

In step S520, the evaluation part 101 calculates errors between the absolute values of the real and imaginary parts of the arithmetic value and the real and imaginary parts of two signal point coordinates, cos(π/8)+i×sin(π/8) and sin(π/8)+i×cos(π/8) in the first quadrant in octonary PSK.

That is, I1[k][n] represents the squared error between the absolute value of the real part of the arithmetic value of array combining operation and the real part of the signal point coordinates cos(π/8)+i×sin(π/8). Q2[k][n] represents the squared error between the absolute value of the imaginary part of the arithmetic value and the imaginary part of the same signal point coordinates.

Similarly, I2[k][n] represents the squared error between the absolute value of the real part of the arithmetic value and the real part of the signal point coordinates sin(π/8)+i×cos (π/8), while Q1[k][n] represents the squared error between the absolute value of the imaginary part of the arithmetic value and the imaginary part of the same signal point coordinates.

P[k] is the evaluation value obtained by multiplying the I1[k][n] by I2[k][n] and Q1[k][n] by Q2[k][n], and combining the multiplication results. After each weight information is subjected to such operation in the evaluation part 101, the evaluation processing ends.

Although the operation of the evaluation part 101 in octonary PSK modulation technique is different from that in QPSK in the present embodiment, the operation in octonary PSK may be equal to that in QPSK. That is, with constant amplitude of the modulated signal in octonary PSK, the evaluation part 101 may calculate a shift of the amplitude value of the sample data from a predetermined amplitude value as an evaluation value.

Although the operation of the evaluation part 101 in QPSK is different from that in octonary PSK in the present embodiment, the operation in QPSK may be equal to that in octonary PSK. As shown in FIG. 2, however, only one signal point is found in the first quadrant in QPSK, and its coordinates are given by sin(π/4)+i*cos(π/4).

It is not required for the evaluation part 101 to perform operations using the above equations (4) with k sequentially varied from 1 to 16, because these operations are not related to each other. Therefore, the operations from P[1] to P[16] can be performed in parallel. The conventional technique using LMS or RLS, however, does not basically allow such parallel operation.

Figure 9:
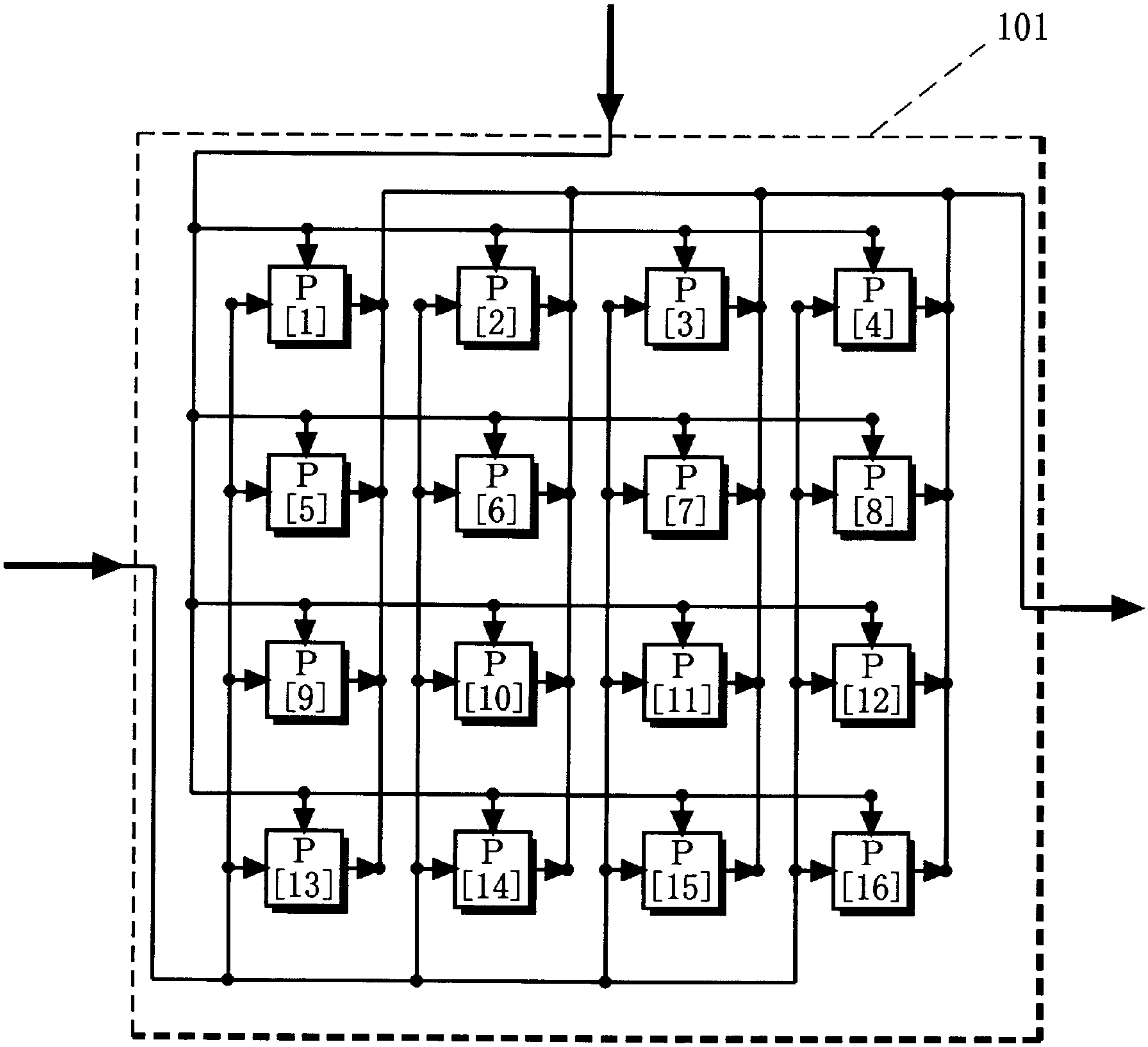
FIG. 9 is a block diagram showing the structure allowing parallel operation in an evaluation part 101.

FIG. 9 is a block diagram showing the structure allowing the above parallel operation in the evaluation part 101. Referring to FIG. 9, two signals are supplied to the evaluation part 101 and then to arithmetic blocks P[1] to P[16] included in the evaluation part 101. Each arithmetic block calculates its own evaluation value using inputted data, and outputs the same. The outputted signals are combined to be outputted from the evaluation part 101. Such structure allows the evaluation part 101 to perform operation 16 times as fast as serial operation.

After the evaluation processing ends, the weighting control part 5 starts processing in subroutine step S600.

Figure 10:
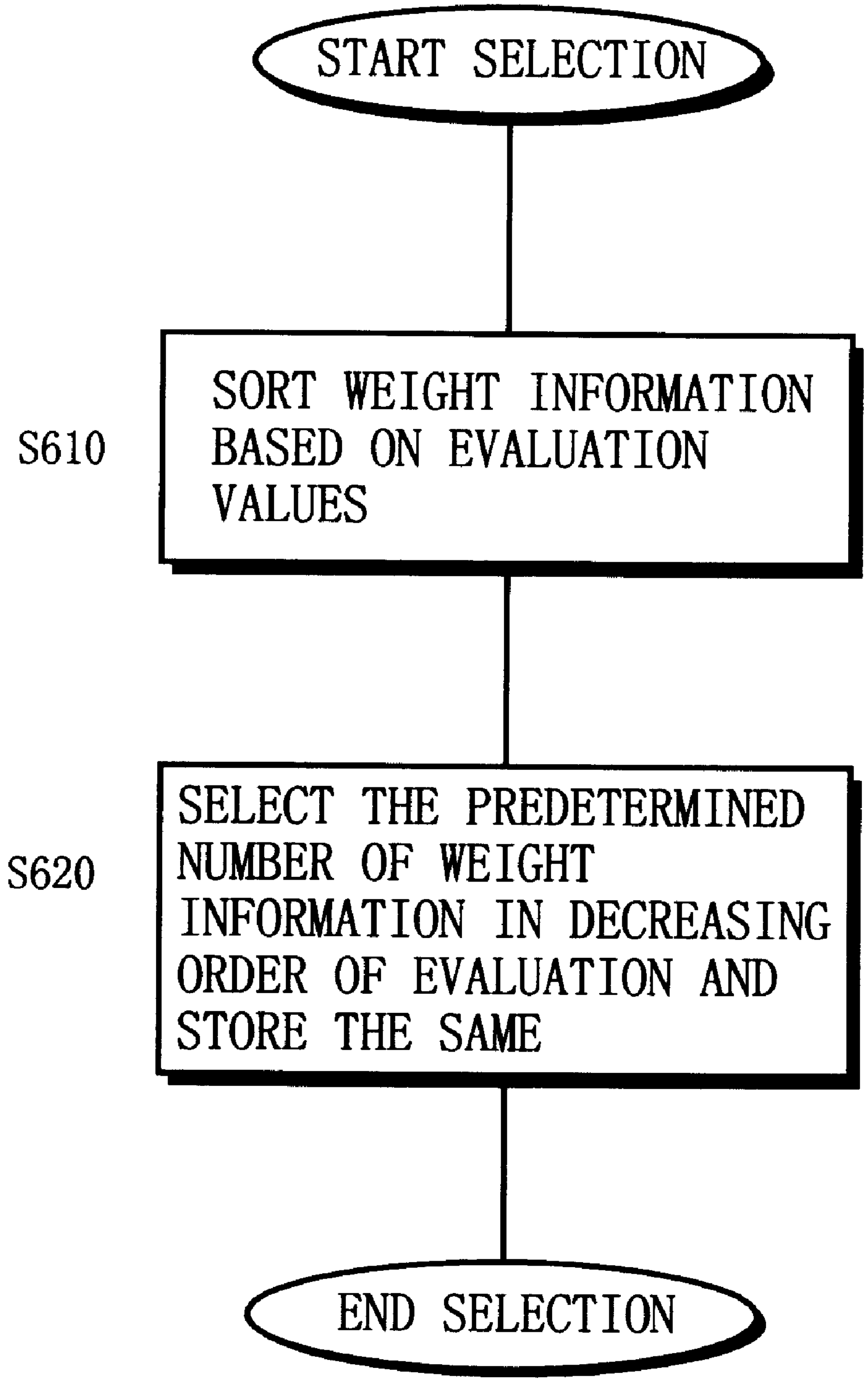
FIG. 10 is a flow chart showing detailed processing in subroutine step S600 (selection) in FIG. 6.

FIG. 10 is a flow chart showing processing in subroutine step S600 (selection) in detail. Referring to FIG. 10, in step S610, the selection part 102 sorts 16 pieces of weight information according to their corresponding evaluation values, the smallest (highest) first.

Next, in step S620, the selection part 102 selects top four, for example, with the smaller (higher) evaluation value, from among the sorted 16 pieces of weight information. The selection part 102 then temporarily stores the selected four, and ends the operation. Note that the number of weight information to be selected is not restricted to four.

After the selection processing ends, the weighting control part 5 starts processing in subroutine step S700.

Figure 11:
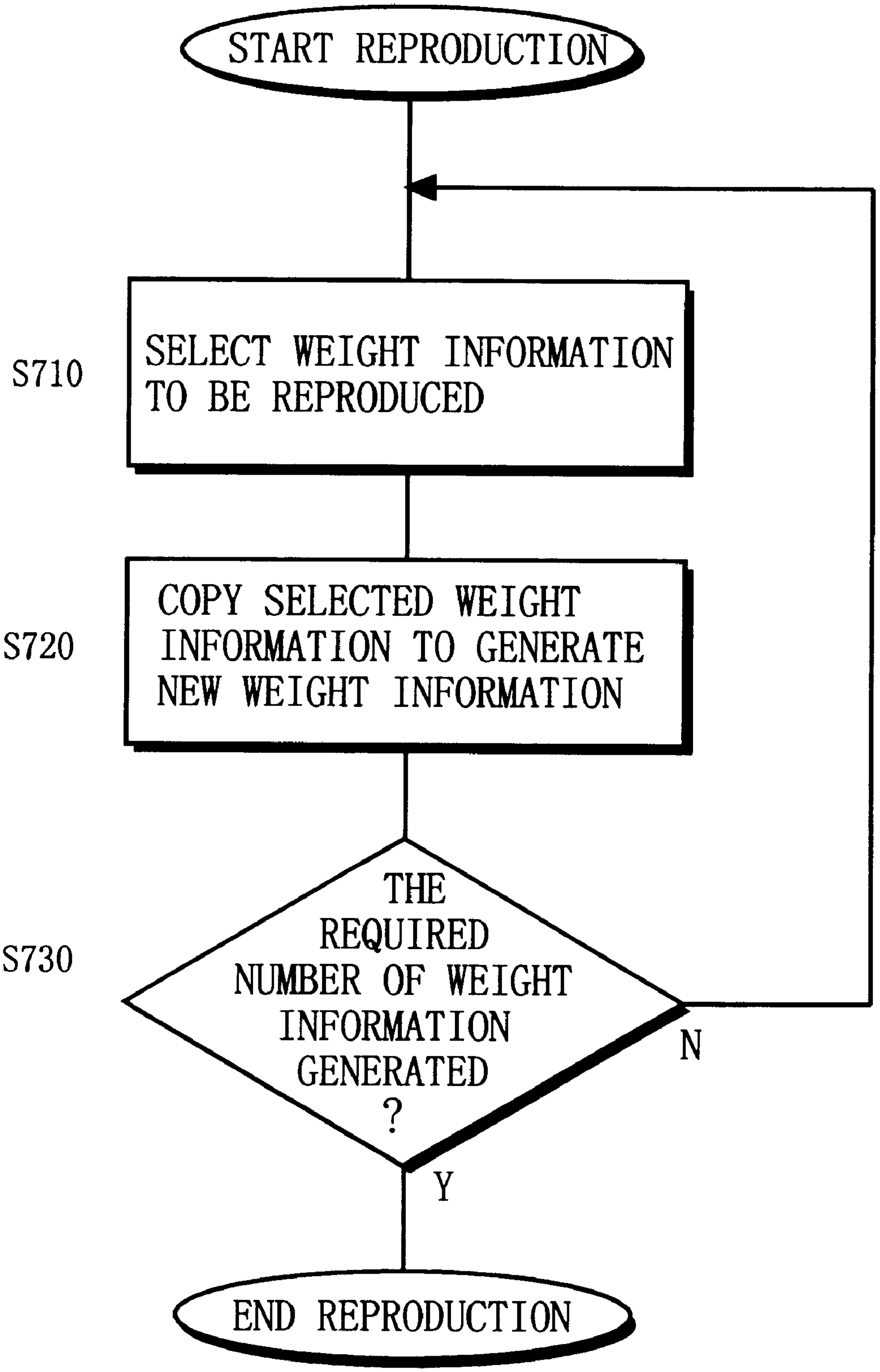
FIG. 11 is a flow chart showing detailed processing in subroutine step S700 (reproduction) in FIG. 6.

FIG. 11 is a flow chart showing processing in subroutine step S700 (reproduction) in detail. Referring to FIG. 11, in step S710, the reproduction part 103 arbitrarily selects one from among the four pieces of weight information selected by the selection part 102. The reproduction part 103 then copies the selected weight information to generate new weight information, and stores the same in the information storage part 100 (step S720).

In step S730, the reproduction part 103 judges whether the number of weight information reaches the required one (here, 4). If no, the selection processing ends. Otherwise, the processing returns back to step S710.

After the selection processing ends, the weighting control part 5 starts processing in subroutine step S800.

Figure 12:
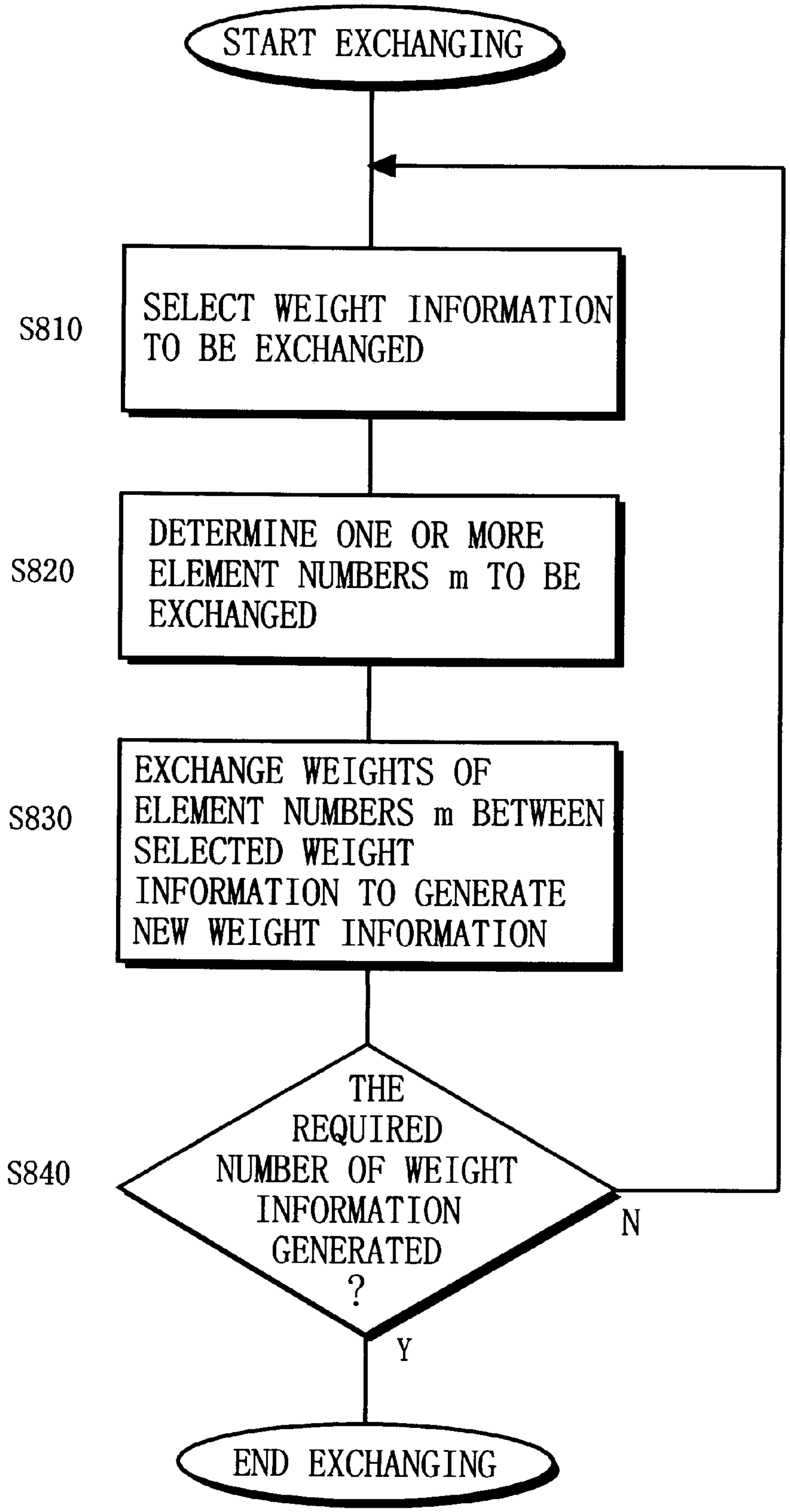
FIG. 12 is a flow chart showing detailed processing in subroutine step S800 (exchanging) in FIG. 6.

FIG. 12 is a flow chart showing processing in subroutine step S800 (exchanging) in detail. Referring to FIG. 12, in step S810, the exchanging part 104 combines the 4 pieces of weight information selected by the selection part 102 according to their evaluation values to generate 4 sets of weight information by combining first-ranked and third-ranked weight information; second-ranked and fourth-ranked; third-ranked and second-ranked; and fourth-ranked and first-ranked. The exchanging part 104 then selects one out of 4 sets of weight information.

The exchanging part 104 then selects one or more element numbers m at random (step S820). The exchanging part 104 exchanges the element weights of the randomly selected element numbers between the combined two pieces of weight information to generate a new set of weight information. The exchanging part 104 supplies the information storage part 100 with the generated new set of two pieces of weight information to store therein (step S830).

Note that for the element weights to be exchanged in step S830, both of their real and imaginary components may be exchanged or either of them may be exchanged. When either of them is exchanged, it is preferred that the real and imaginary components be alternately selected to be exchanged every time the exchanging part 104 operates. Such arrangement allows high convergence rate to solution for each component.

In step S840, the exchanging part 104 judges whether the number of weight information reaches the required one (here, 4 sets, 8 pieces). If no, the processing returns to step S810. If yes, the exchanging processing ends.

After exchanging processing ends, the weighting control part 5 starts processing in subroutine step S900.

Figure 13:
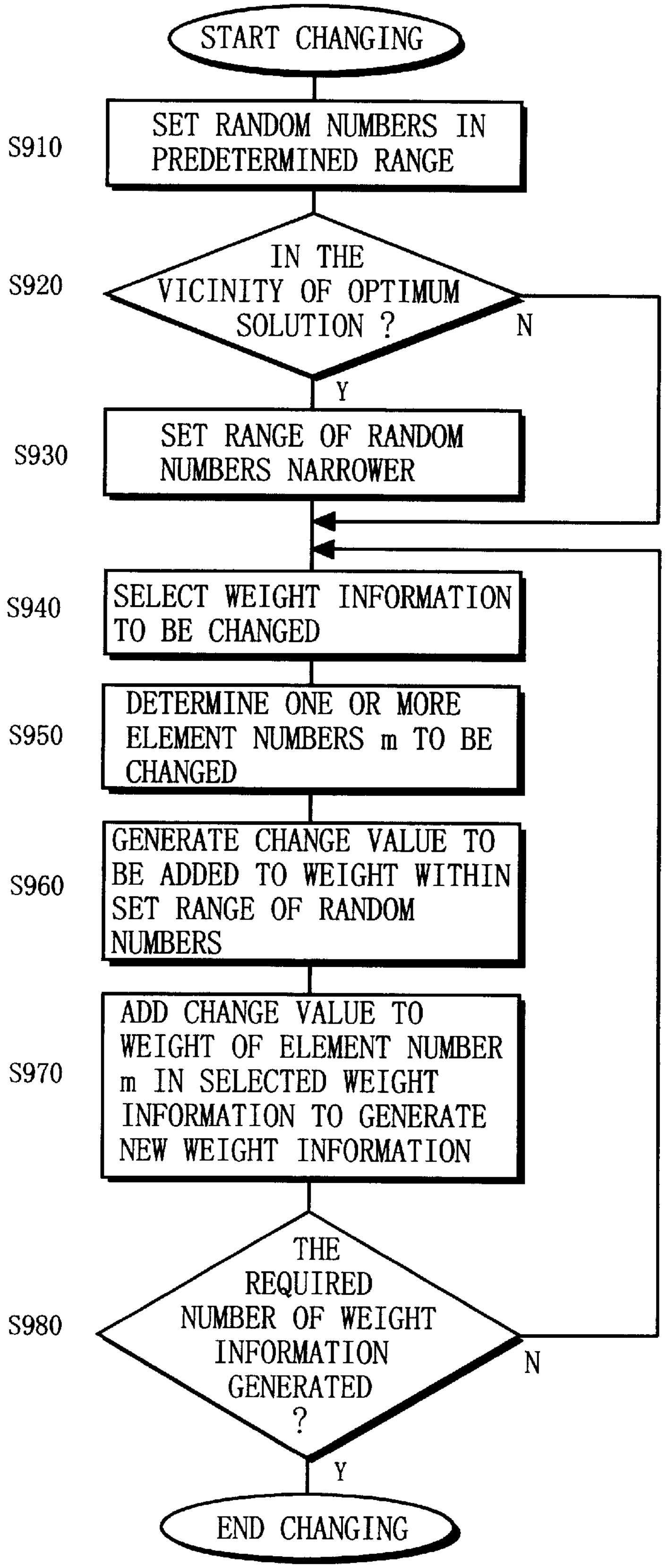
FIG. 13 is a flow chart showing detailed processing in subroutine step S900 (changing) in FIG. 6.

FIG. 13 is a flow chart showing processing in subroutine step S900 (changing) in detail. Referring to FIG. 13, in step S910, the changing part 105 sets the range of random numbers to a certain range, for example, a range A (−0.1 to 0.1, −0.1i to 0.1i) herein.

In step S920, the changing part 105 judges whether solutions are converging in the vicinity of the optimum solution. Specifically, the changing part 105 finds the maximum evaluation value among the 4 pieces of weight information selected by the selection part 102. When the maximum evaluation value is 4 or more, the changing part 105 determines that solutions are not yet converging, and jumps to step S940. Otherwise, the changing part 105 determines that solutions are converging, and proceeds to step S930.

In step S930, the changing part 105 sets the range of random numbers narrower than that in step S910, to a range B (−0.05 to 0.05, −0.05i to 0.05i), for example.

In step S940, the changing part 105 arbitrarily selects one out of the 4 pieces of weight information selected by the selection part 102. The changing part then finds one or more element numbers m at random (step S950).

In step S960, the changing part 105 randomly generates a change value within the set range B. Furthermore, either the real or imaginary component of the change value may be 0. When either one is 0, the changing part 105 preferably alternately selects the real and imaginary component for each operation to set it to 0.

In step S970, the changing part 105 adds the randomly-generated change value to the element weight corresponding to the element number m found as described above, taking a resultant value as a new element weight. The changing part 105 causes the information storage part 100 to store the new four pieces of weight information.

In step S980, the changing part 105 judges whether the number of weight information reaches the required one (here, 4). If yes, the processing ends. Otherwise, the processing returns to step S940.

Instead of the above operation, the changing part 105 may perform the following operation. In step S920, the changing part 105 judges whether solutions are converging in the vicinity of the optimum solution according to the number of iterations of operation in each of the information storage part 100, the evaluation part 101, the selection part 102, the reproduction part 103, the exchanging part 104, and the changing part 105. Specifically, the changing part 105 determines that solutions are converging in the vicinity of the optimum solution when the number of iterations of operation in each part is 32 or more, while determines that solutions are not converging when otherwise. In this operation, since not required to calculate the maximum evaluation value, the changing part 105 can have a simple structure.

After the evaluation processing ends, the weighting control part 5 starts processing in step S600.

In FIG. 6, it is herein described that subroutine steps S700 to S900 are sequentially executed. These steps, however, may be simultaneously executed in parallel. As shown in FIG. 5, the reproduction part 103, the exchanging part 104, and the changing part 105 are configured so as to be able to perform parallel processing. Such parallel processing allows operation faster than serial processing.

In step S1000 shown in FIG. 6, the determination part 106 increments the variable Count by 1. Further, in step S1100, the determination part 106 judges whether the variable Count reaches 4. If no, the processing advances to step S1200. Otherwise, the processing returns to step S500.

In step S1200, the determination part 106 extracts the weight information with the second-ranked evaluation value from the four pieces of weight information temporarily stored in the selection part 102. The extracted weight information is supplied to the above described weighting part 4 as the weight information for weighting.

The reason why the weight information with the second-ranked evaluation value is extracted herein is that the weight information with the first-ranked evaluation value may be erroneously obtained due to noise, and if there is a high possibility of such case, the one with the second-ranked evaluation value is thought to be more accurate.

If there is a low possibility of such case, however, the determination part 106 preferably outputs the weight information with the first-ranked evaluation value as the weight information for weighting.

In step S1300, the buffer 107 detects the presence or absence of receive signals. If the receive signal is present, the processing returns to step S300. Otherwise, the processing ends.

(Second Embodiment)

Figure 14:
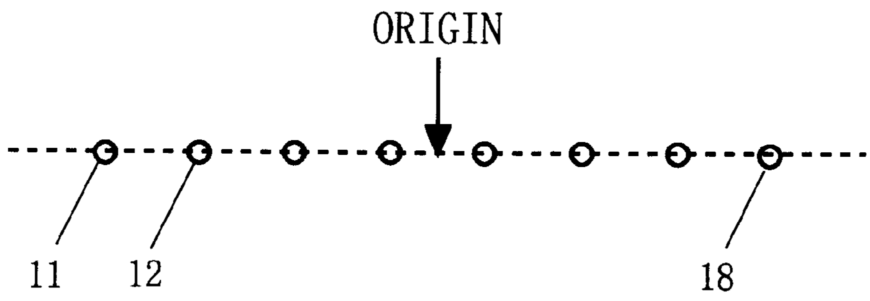
FIG. 14 is a schematic diagram showing an arrangement of antenna elements according to a second embodiment of the present invention.

An adaptive array antenna according to a second embodiment is similarly structured as that according to the first embodiment as shown in FIG. 1. The eight antenna elements 11 to 18 in the array antenna part 10 are, however, evenly spaced apart in line, as shown in FIG. 14. Therefore, the same operation as in the first embodiment is herein omitted, and different operation is now described.

As in the first embodiment, 16 pieces of weight information are provided also in the second embodiment. Each weight information includes 4 element weights. Such weight information can be represented by W[k][m], where k is the weight information number, which is a natural number of 16 or less; and mis the element number, which is a natural number of 4 or less.

Figure 15:
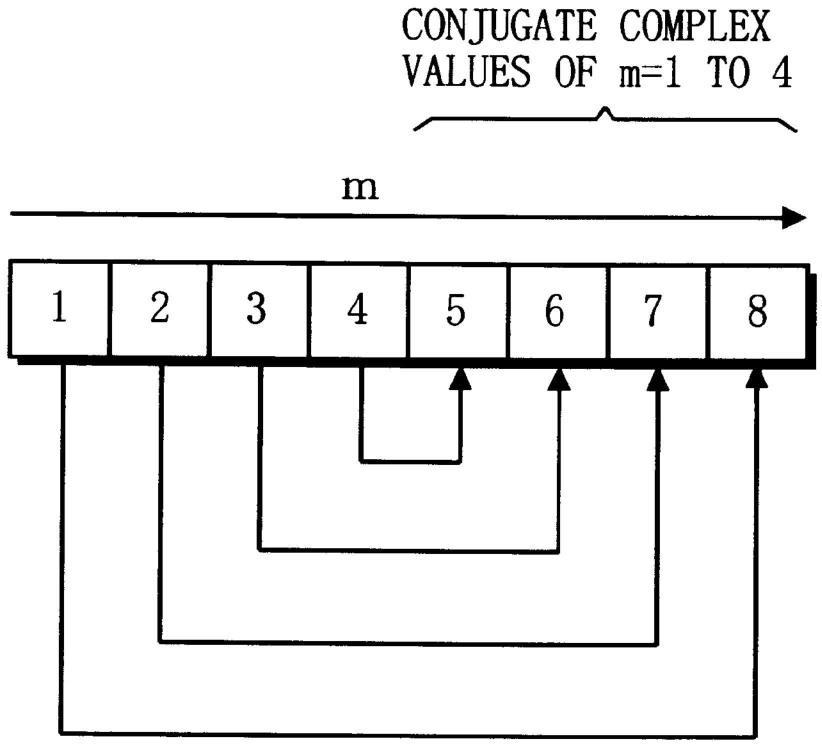
FIG. 15 is a diagram showing a method of exchanging weight information in the second embodiment.

Since 8 antenna elements are provided, 4 element weights included in each weight information and additional 4 element weights are required for performing operation for evaluation and weighting. Therefore, as shown in FIG. 15, for evaluation and weighting, conjugate complex numbers of the element weights with element numbers 1 to 4 are calculated as the element weights with element numbers 8 to 5.

Therefore, although including only 4 element weights, each weight information is assumed to include 8 element weights. For evaluation and weighting, m in the weight information W[k][m] is assumed to be a natural number of 8 or less.

The reason why the conjugate complex numbers of the element weights with the element numbers 1 to 4 can be taken as those with the element numbers 8 to 5 is that, as shown in FIG. 14, the antenna elements are arranged symmetrically.

For example, two antenna elements 11 and 18 provided symmetrically with respect to the origin are positioned equidistant from the origin. Receive signals between these antenna elements are shifted in phase for the same amount with respect to the origin. Therefore, these receive signals have a conjugate complex relation. The conjugate complex relation can also be observed in their corresponding element weights.

Therefore, the above weight information structure can reduce the number of element weights included in each weight information to half of the actual number of antenna elements, allowing a high convergence rate to solution in search with higher accuracy.

In other words, as described later, the time required for convergence to solution in the exchanging part 104 and the changing part 105 becomes longer as the number of element weights becomes more; the less the number of element weights, the higher the convergence rate to solution. In the case such as the second embodiment in which solution has to be searched in a short period of time, solution accuracy can be improved.

Referring to FIG. 6, operation of the weighting control part 5 is now described. The operation in steps S100 to S700 are the same as that in the first embodiment. In evaluation processing, however, the conjugate complex numbers of the element weights with the element numbers 1 to 4 are calculated as described above as the element weights with the element numbers 8 to 5.

In subroutine step S800, the exchanging part 104 performs the same operation as in the first embodiment. Instead, the exchanging part 104 may perform the following operation in the second embodiment.

Figure 16:
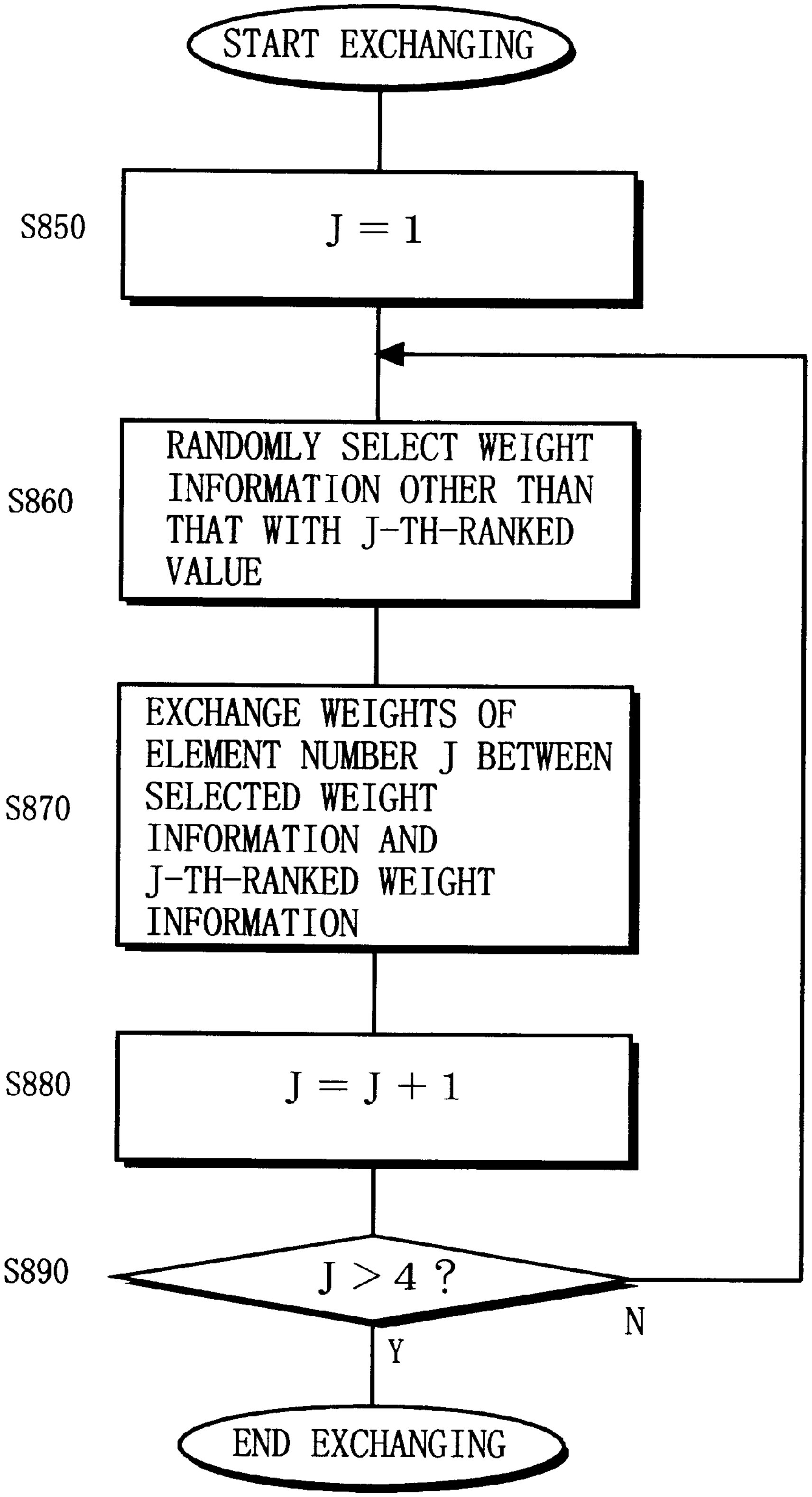
FIG. 16 is a flow chart showing processing in subroutine step S800 (exchanging) in FIG. 6 in the second embodiment.

Referring to FIG. 16, another exchanging operation in subroutine step S800 is now described. In step S850, the exchanging part 104 sets an initial value of a variable J to 1. The exchanging part 104 then randomly selects one piece of weight information other than the weight information with the Jth-ranked evaluation value from among the weight information selected by the selection part 102 (step S860).

In step S870, the exchanging part 104 collects the weight information with the Jth-ranked evaluation value and the weight information selected at random as a set. Furthermore, the exchanging part 104 exchanges the element weights with the element number J included in the set of weight information to generate a new set of weight information. The generated weight information is stored in the information storage part 100.

The exchanging part 104 then increments J by 1 (step S880). In step S890, the exchanging part 104 judges whether J is more than 4 or not. If no, the processing returns to step S860. Otherwise, the exchanging processing ends.

Figure 17:
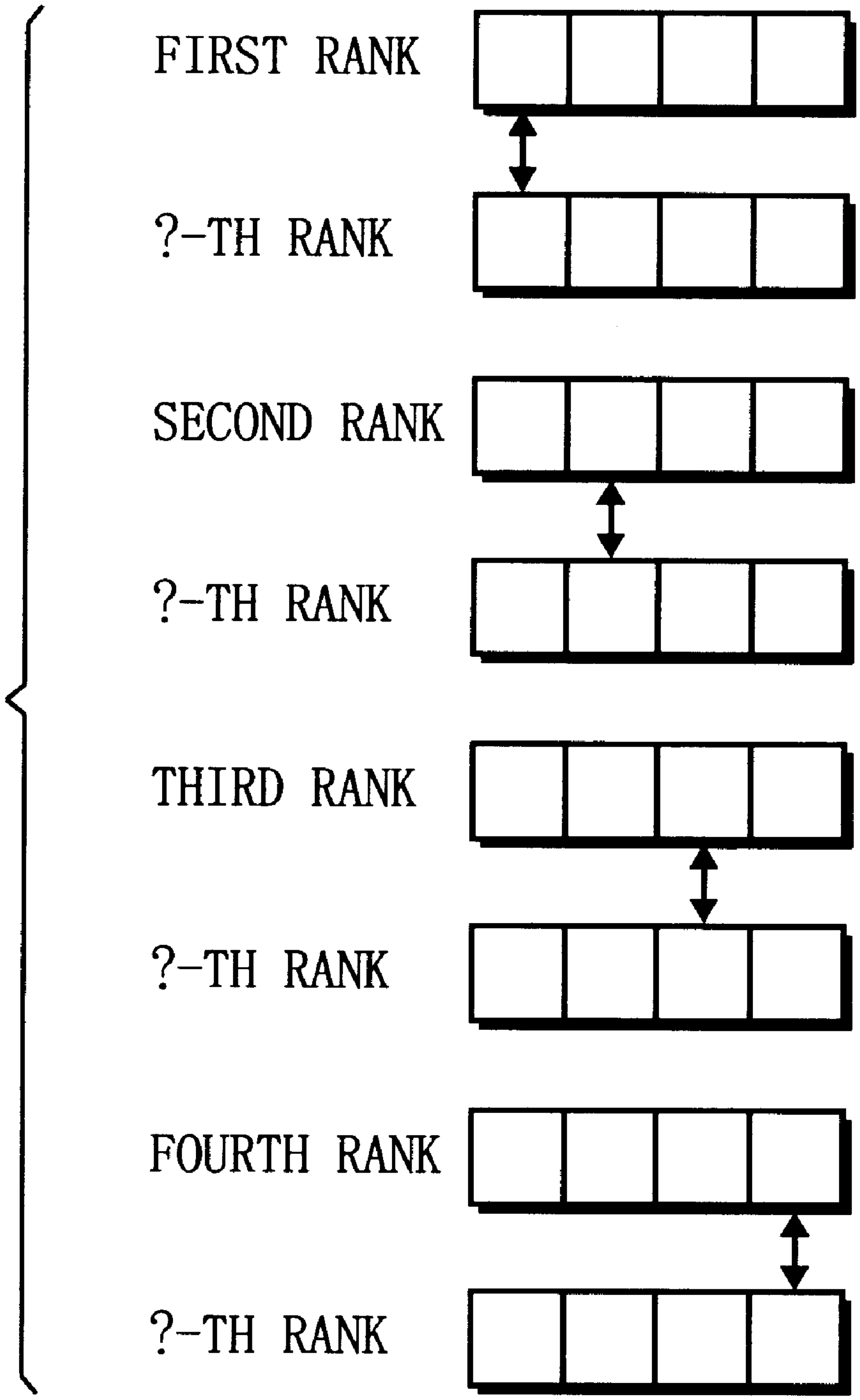
FIG. 17 is a schematic diagram showing an exemplary method of exchanging weight information in the second embodiment.

FIG. 17 is a schematic diagram showing operation of the above described exchanging part 104. In FIG. 17, ? represents the evaluation rank of the weight information randomly selected so that the evaluation ranks are varied from each other in one set of weight information. Double-headed arrows represent operation of exchanging the element weights. Through the operation as shown in FIG. 17, the exchanging part 104 causes the information storage part 100 to store the generated 4 sets, 8 pieces of weight information.

As described above, each weight information includes only 4 element weights in the second embodiment. Therefore, the above operation of the exchanging part 104 reduces the number of element weights to be exchanged by half of 8 elements included in the weight information in the first embodiment. The exchanging part 104 can thus perform operation with a high convergence rate to solution.

The changing part 105 performs similar operation to that in the first embodiment. Note that in the second embodiment, each weight information includes only four element weights. Therefore, as described above for the exchanging part 104, the changing part 105 can also perform operation with a high convergence rate to solution, compared to the case where each weight information includes eight element weights.

Since the determination part 106 performs the same operation as in the first embodiment, its description is omitted.

(Third Embodiment)

Figure 18:
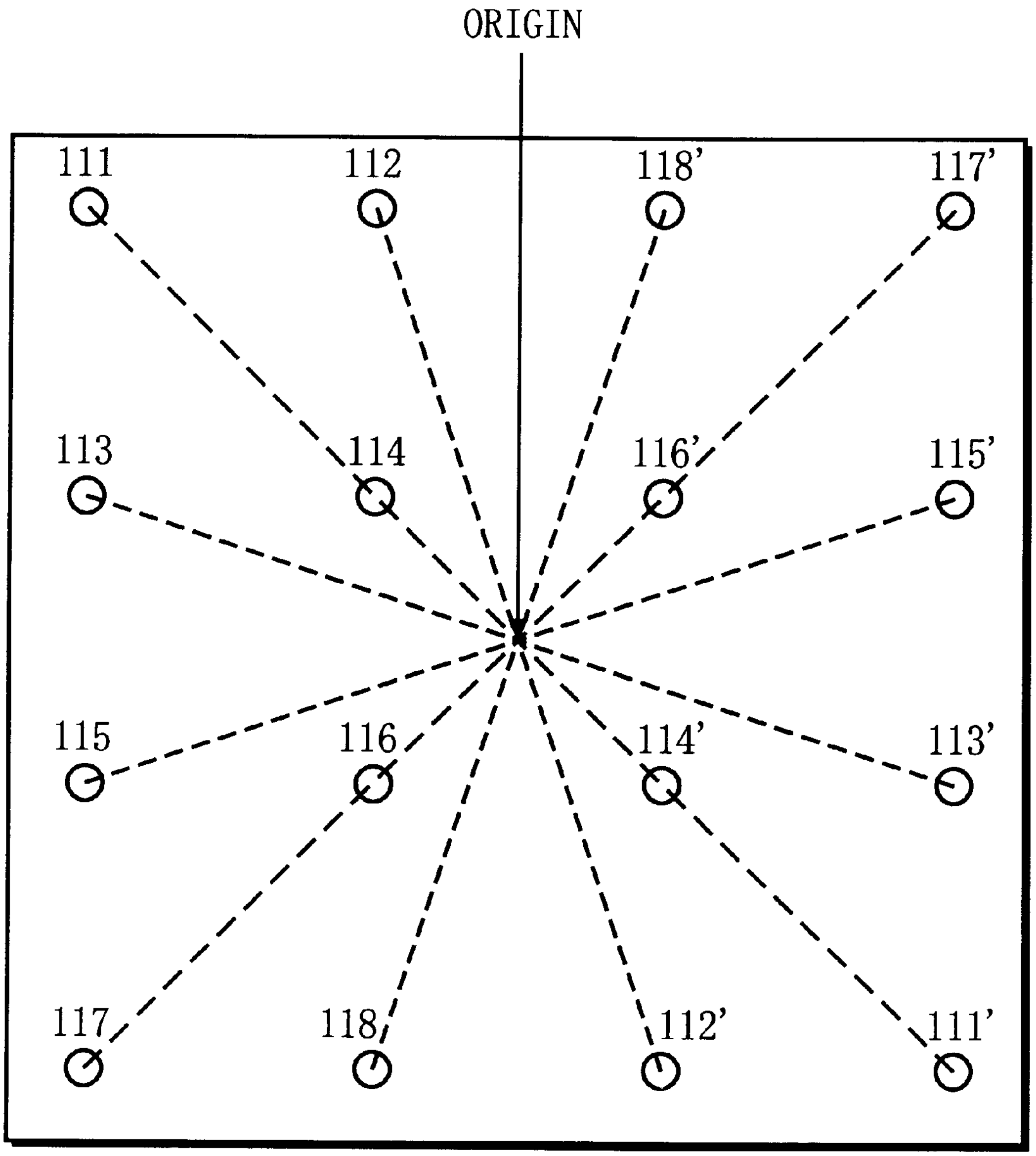
FIG. 18 is a schematic diagram showing an arrangement of antenna elements according to a third embodiment of the present invention.

Described next is operation of an adaptive array antenna according to a third embodiment of the present invention. The structure of the adaptive array antenna according to the third embodiment is similar to that in the first and second embodiments, except including 16 antenna elements as shown in FIG. 18.

More specifically, the adaptive array antenna of the third embodiment is partly different from that as shown in FIG. 1, being structured to apply each predetermined weight to 16 signals from an array antenna part. The array antenna part includes 16 antenna elements, and their corresponding 16 tuners and A/D converters. Also in the third embodiment, 16 pieces of weight information are provided, each including 8 element weights.

With 16 antenna elements, however, 8 element weights included in each weight information and additional 8 element weights are required for evaluation and weighting. Therefore, as in the second embodiment, the complex conjugate numbers of the element weights with element numbers 1 to 8 are calculated as the element weights with element numbers 16 to 9 for evaluation and weighting.

Therefore, although actually including only 8 element weights, each weight information is assumed to include 16 element weights for evaluation and weighting. Thus, m in the weight information W[k][m] is assumed to be a natural number of 16 or less for evaluation and weighting.

The reason why the conjugate complex numbers of the element weights with the element numbers 1 to 8 are taken as the element weights with the element numbers 16 to 9 is that the antenna elements are positioned symmetrically with respect to the origin, as shown in FIG. 18.

Referring to FIG. 18, the antenna elements 111 and 111' are symmetrically positioned in line with respect to the origin. The same goes for the relation between the antenna elements 112 to 118 and 112' to 118', respectively. As described in the second embodiment, receive signals between these antenna elements are shifted in phase for the same amount with respect to the origin. Therefore, these receive signals have a conjugate complex relation. The conjugate complex relation can also be observed in corresponding element weights.

Therefore, the above structure of the weight information can reduce the number of element weights included in each weight information to half of the actual number of antenna elements, allowing a high convergence rate to solution in search with higher accuracy, as in the second embodiment.

The operations of the selection part 102, the reproduction part 103, the exchanging part 104, the changing part 105, and the determination part 106 in the adaptive array antenna according to the third embodiment are the same as those in the first embodiment, and their description is omitted herein. However, m in the weight information W[k][m] is assumed to be a natural number of 16 or less for evaluation. Therefore, 16 signals are subjected to the array combining operation in the third embodiment, which is different from the operation in the first embodiment.

(Fourth Embodiment)

Described next is operation of an adaptive array antenna according to a fourth embodiment of the present invention. The structure of the adaptive array antenna according to the fourth embodiment is the same as that according to the third embodiment in that 16 antenna elements are provided. These antenna elements, however, are arranged in coordinate positions as shown in FIG. 19.

Figure 19:
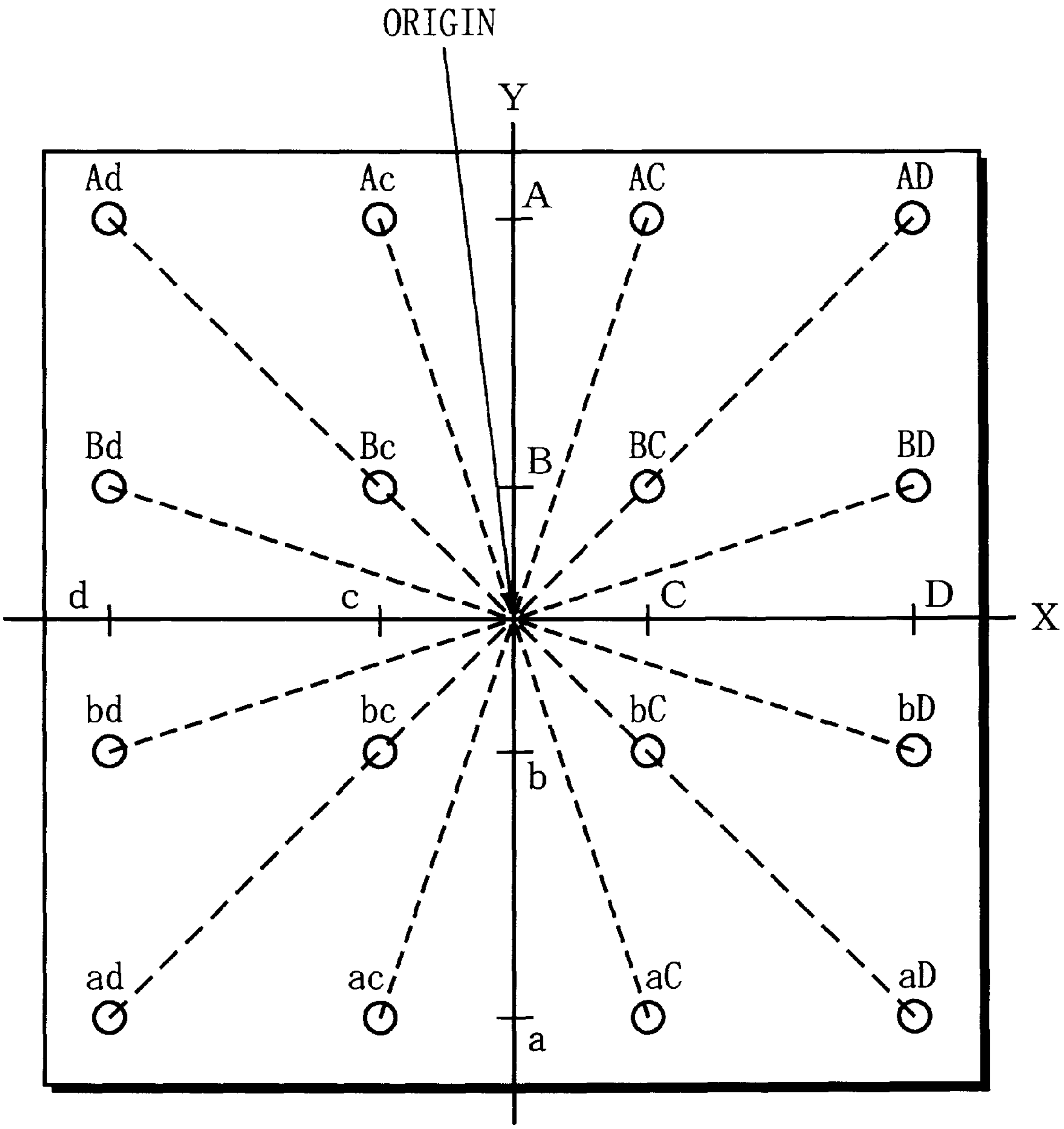
FIG. 19 is a schematic diagram showing an arrangement of antenna elements according to a fourth embodiment of the present invention.

FIG. 19 shows coordinates of the X-axis and Y-axis orthogonal to each other. Shown on the X-axis are A, a; and B, b, equidistant from the origin, and shown on the Y-axis are C, c; and D, d, equidistant from the origin. Therefore, A, a; B, b; C, c; and D, d have a conjugate complex relation with each other. 16 antenna elements included in the adaptive array antenna are provided at the combinations of these coordinates on the X-axis and Y-axis.

The element weight corresponding to each of these antenna elements can be specified by a combination of the coordinates having the above conjugate complex relation. For example, in FIG. 19, the antenna element provided on upper-left has the x and y coordinates (d, A), while the one provided on lower-left has the coordinates (d, a). Therefore, the weight elements corresponding to these two antenna elements can be found by multiplying A by d, and a by d, respectively.

In this way, the element weights corresponding to the antenna elements are specified by the combinations of 4 x-y coordinates and their corresponding x-y coordinates having a conjugate complex relation with the 4 coordinates. Therefore, although 16 pieces of weight information are provided in the fourth embodiment, 4 element weights are enough in each weight information.

With 16 antenna elements, however, by multiplying 4 element weights included in each weight information each other, the element weights with the element numbers 1 to 16 are calculated for evaluation and weighting.

Therefore, although actually including only 4 element weights, each weight information is assumed to include 16 element weights for evaluation and weighting. Thus, m in the weight information W[k][m] is assumed to be a natural number of 16 or less.

Therefore, the above structure of the weight information can reduce the number of element weights included in each weight information to one-quarter the actual number of antenna elements, allowing a higher convergence rate to solution in search with higher accuracy, compared to the third embodiment.

The operations of the selection part 102, the reproduction part 103, the exchanging part 105, and the determination part 106 in the adaptive array antenna according to the fourth embodiment are the same as those in the second embodiment, and their description is omitted herein. However, m in the weight information W[k][m] is assumed to be a natural number of 16 or less for evaluation. Therefore, 16 signals are subjected to the array combining operation in the fourth embodiment, which is different from the operation in the second embodiment.

(Fifth Embodiment)

The adaptive array antenna according to a fifth embodiment of the present invention is structured similarly to that in the first embodiment as shown in FIG. 1, while the structure of weight information in the fifth embodiment is different from the other embodiments. Therefore, description of the same operation as in the first embodiment is omitted herein, and only the description of different operation is now made.

As in the first embodiment, 16 pieces of weight information are provided in the fifth embodiment. Each weight information includes 8 element weights and a rotator R. Therefore, each weight information includes 9 components, which can be represented by W[k][1], W[k][2], . . . W[k][8], R[k], where k is the weight information number, a natural number of 16 or less. Those 9 components included in each weight information are provided with component numbers 1 to 9.

Referring to FIG. 6, operation of the weighting control part 5 is now described. The operations in steps S100 to S400 are the same as those in the first embodiment. In subroutine step S500, the evaluation part 101 performs operation as follows.

Referring to FIG. 8, described is operation of the evaluation part 101 in octonary PSK. As descried above, the signal point coordinates are illustrated as in FIG. 3.

In step S510, provided with data from the buffer 107 and the information storage part 100, the evaluation part 101 performs arithmetic operation given by $$I1[k][n]=\left(\left|\mathrm{real}\left(\sum_{m=1}^{8}(S[n][m]\times W[k][m])\times R[k]\right)\right|-\cos(\pi/8)\right)^2 \quad (5)$$

$$I2[k][n]=\left(\left|\mathrm{real}\left(\sum_{m=1}^{8}(S[n][m]\times W[k][m])\times R[k]\right)\right|-\sin(\pi/8)\right)^2$$

$$Q1[k][n]=\left(\left|\mathrm{imag}\left(\sum_{m=1}^{8}(S[n][m]\times W[k][m])\times R[k]\right)\right|-\cos(\pi/8)\right)^2$$

$$Q2[k][n]=\left(\left|\mathrm{imag}\left(\sum_{m=1}^{8}(S[n][m]\times W[k][m])\times R[k]\right)\right|-\sin(\pi/8)\right)^2$$

$$P[k]=\sum_{n=1}^{32}((I1[k][n]\times I2[k][n])+(Q1[k][n]\times Q2[k][n]))$$

where real represents extraction of the real component, and imag represents extraction of the imaginary component.

As shown in equations (5), the evaluation part 101 performs the above described array combining operation with the sample data S[n][m] and the weight information stored in the information storage part 100, and further multiplies the result by the rotator to generate an arithmetic value. In step S520, the evaluation part 101 performs the same operation as that in the first embodiment.

The operations of the weighting control part 5 in subroutine steps S600 and S700 are the same as those in the first embodiment. In subroutine step S800, the exchanging part 104 performs the operation as follows, where m in FIGS. 12 and 13 represents the component number instead of the element number.

Referring to FIG. 12, in step S810, the exchanging part 104 performs the same operation as in the first embodiment. The exchanging part 104 then selects one or more component numbers at random (step S820). The exchanging part 104 exchanges the element weights or rotators of the component numbers selected at random between the combined two pieces of weight information to generate a new set of weight information. The exchanging part 104 causes the information storage part 100 to store the generated set of two pieces of weight information (step S830).

In step S840, the exchanging part 104 performs the same operation as in the first embodiment. After exchanging processing ends, the weighting control part 5 starts processing in subroutine step S900.

Referring to FIG. 13, in steps S910 to S940, the changing part 105 performs the same operations as those in the first embodiment. In step S950, the changing part 105 finds one or more component numbers at random.

In step S960, the changing part 105 randomly generates a change value within a set range of random numbers. In step S970, the changing part 105 adds the change value generated at random to the element weight corresponding to the component number obtained as described above, and takes the resultant value as a new element weight. However, when the obtained component number is 9, that is, the rotator, the change value is first divided by half, and then added to the rotator, and takes the resultant value as a new rotator. The changing part 105 causes the information storage part 100 to store the generated four pieces of weight information. In step S980, the changing part 105 performs the same operation as in the first embodiment.

Alternatively, the changing part 105 may perform the same operation as in the first embodiment instead of the above described operation. In step S920, the changing part 105 judges whether solutions are converging in the vicinity of the optimum solution according to the number of iterations of operation in the information storage part 100, the evaluation part 101, the selection part 102, the reproduction part 103, the exchanging part 104, and the changing part 105. Specifically, the changing part 105 determines that solutions are converging in the vicinity of the optimum solution when the number of iterations of operation is 32 or more, and determines otherwise when the number of iterations of operation is less than 32. In such operation, calculation of the maximum evaluation value is not required, thereby allowing a simple structure of the changing part 105.

Referring next to FIG. 6, in steps S1000 and S1100, the determination part 106 performs the same operations as those in the first embodiment, and therefore their description is omitted herein.

In step S1200, the determination part 106 extracts the weight information with the second-ranked evaluation value from the 4 pieces of weight information temporarily stored in the selection part 102, as described above. The extracted weight information includes 8 element weights and 1 rotator R. The determination part 106 multiplies each of 8 element weights by the rotator. The determination part 106 inputs the resultant values to the weighting part 4 as weight information for weighting.

In this way, the adaptive array antenna of the fifth embodiment includes the rotator R in the weight information. Multiplication by the rotator R can eliminate adjustments to phase rotation by a demodulator (not shown). Further, the rotator R included in the weight information provides 8 element weights with a restriction to phase rotation, allowing them to perform weighting with high accuracy.

(Sixth Embodiment)

An adaptive array antenna according to a sixth embodiment of the present invention is formed by adding the structure and operation for training to those of the adaptive array antenna of the first or second embodiment. Therefore, the adaptive array antenna according to the sixth embodiment performs the same operation as in the first or second embodiment except it performs training for a certain period of time. In the training period, a signal to be transmitted is a signal for training. Described below is the different operation only, with reference to FIG. 6.

In FIG. 6, the operations of the adaptive array antenna according to the sixth embodiment until step S400 are the same as those in the first or second embodiment. The adaptive array antenna according to the sixth embodiment performs training during a certain period after start receiving, typically, during a period for receiving first 16 symbols.

Figure 20:
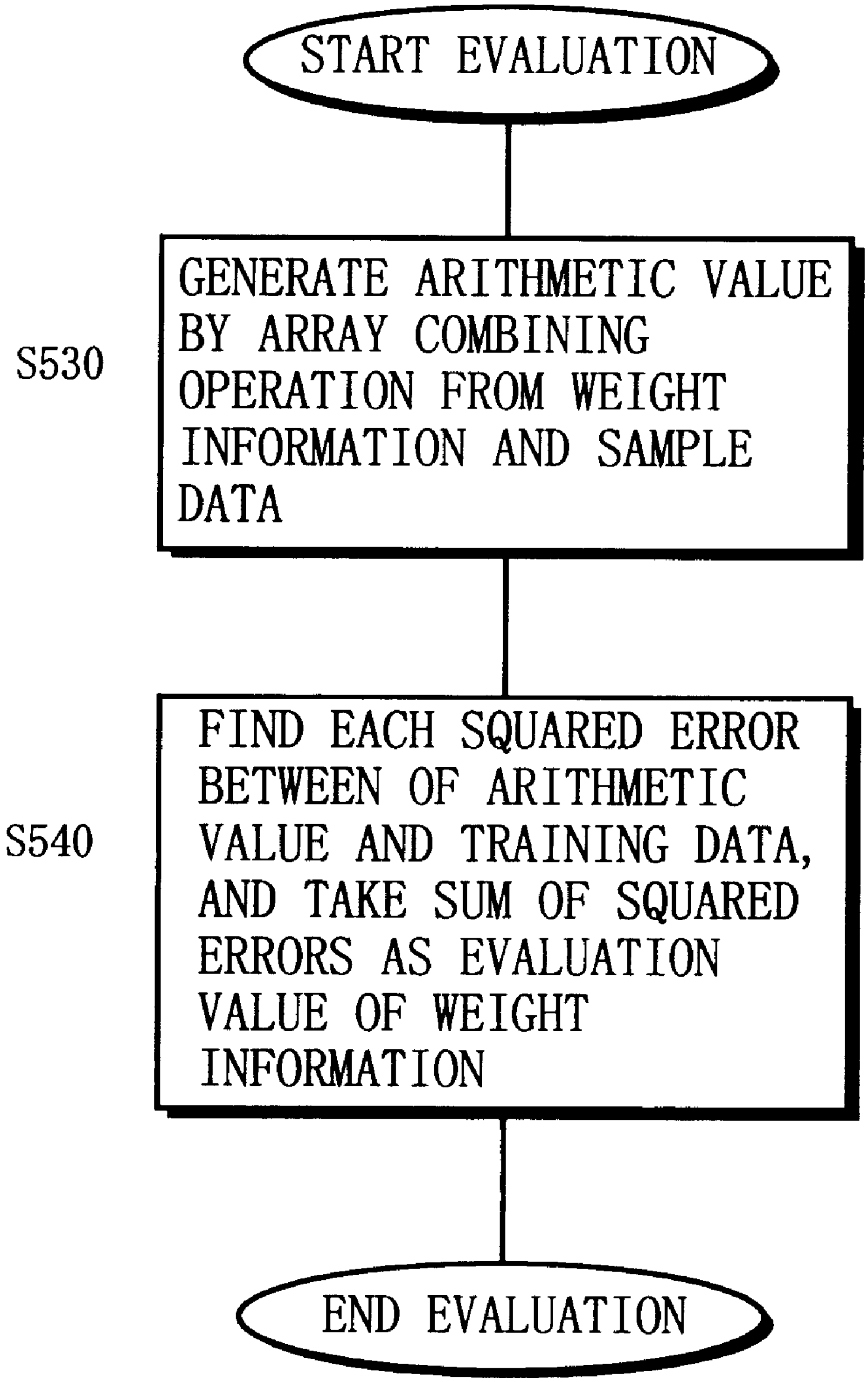
FIG. 20 is a flow chart showing detailed processing in subroutine step S500 (evaluation) in a sixth embodiment of the present invention.

In subroutine step S500, the evaluation part 101, which performs training, performs different operation from that in the adaptive array antenna of the first or second embodiment. FIG. 20 is a flow chart showing processing in subroutine step S500 in the sixth embodiment.

Referring to FIG. 20, in step S530, the evaluation part 101 performs the above described array combining operation with the weight information and the sample data to generate arithmetic values. Next, in step S540, the evaluation part 101 finds each squared error between each generated value and training data, and takes the sum of the squared errors as the evaluation value of the weight information. Such operation can be represented by $$P[k] = \sum_{n=1}^{32}\left(\mathrm{real}\left(\sum_{m=1}^{8}(S[n][m]\times W[k][m])\right) - \mathrm{real}(D[n])\right)^2 + \sum_{n=1}^{32}\left(\mathrm{imag}\left(\sum_{m=1}^{8}(S[n][m]\times W[k][m])\right) - \mathrm{imag}(D[n])\right)^2 \quad (6)$$

where real means extraction of the real component and imag means extraction of the imaginary component.

In the above equation (6), D[n] represents the predetermined training data, and n represents the sample number. The predetermined training data may be data of alternate zeros and ones, or data with different 16 symbols. The signal to be transmitted includes the predetermined training data.

As shown in equation (6), the evaluation part 101 subjects the sample data S[n][m] as shown in FIG. 4 and the weight information stored in the information storage part 100 to the array combining operation. The evaluation part 101 finds each squared error (squared difference) between each arithmetic result and the predetermined training data D[n] for each of the real and imaginary components, and combines the resultant values to obtain an evaluation value P[k].

The evaluation value is calculated for each of 16 pieces of weight information. The evaluation part 101 of the sixth embodiment, therefore, obtains 16 evaluation values, which is the same as in the first or second embodiment.

The operations of the selection part 102, the reproduction part 103, the exchanging part 104, the changing part 105, and the determination part 106 of the adaptive array antenna of the sixth embodiment in subroutine steps S600 to S1200 are the same as those in the first embodiment, and therefore their description is omitted herein. Furthermore, the adaptive array antenna according to the sixth embodiment omits the operation in step S1300.

Since the buffer 107 stores data for 4 symbols in one operation, storing operation is required four times for 16 symbols of data. After four operations, the present adaptive array antenna ends training operation.

After the training operation, the present adaptive array antenna performs the same operations as those in the first or second embodiment. Therefore, the adaptive array antenna of the sixth embodiment is characterized as performing the same operations as those in the adaptive antenna of the first or second embodiment and further performing training.

Furthermore, the adaptive array antenna of the sixth embodiment may be structured by the adaptive array antenna of the third or fourth embodiment with training operation. The element number m, however, is an integer of 1 to 16 according to the number of antenna elements.

Still further, the adaptive array antenna of the sixth embodiment may be structured by the adaptive array antenna of the fifth embodiment with training operation. Each value obtained by array combining operation, however, has to be multiplied by the rotator R. Such multiplication is represented by $$P[k] = \sum_{n=1}^{32}\left(\text{real}\left(\sum_{m=1}^{8}(S[n][m]\times W[k][m])\times R[k]\right) - \text{real}(D[n])\right)^2 + \sum_{n=1}^{32}\left(\text{imag}\left(\sum_{m=1}^{8}(S[n][m]\times W[k][m])\times R[k]\right) - \text{imag}(D[n])\right)^2 \quad (7)$$

Such training operation can converge the signal points of the sample data only to the predetermined coordinates of the signal points for training. Therefore, the element weights with which a desired signal can be accurately separated can be obtained.

When parallel processing is not performed, the adaptive array antenna of each embodiment using a so-called genetic algorithm has an advantage, despite relatively large amount of operation, over the conventional adaptive array antenna using LMS in a high convergence rate to solution, allowing adaptive control with high accuracy. Described below is the amount of operation in the embodiments of the present invention and in the conventional adaptive array antenna.

To evaluate the amount of operation in LMS, RLS, and the algorithm used herein according to the same criteria, compare the algorithm used in the sixth embodiment having a training signal with the LMS and RLS algorithms. As described above, assume that each amount of operation for addition and subtraction in 16 bits is 1, each amount of operation for exchanging and reproduction is 1, the amount of operation for parity check is 1, and the amount of operation for squaring the absolute value of a complex number is 33 (16+16+1=33).

In the algorithm of the sixth embodiment of the present invention, the amounts of operation are: 4 (1×4=4) in the reproduction part; 8 (1×2×4=4) in the changing part; 8 (1×8=8) in the exchanging part; 256 (1(parity check)×16×16=256) in the selection part; 9264 ((66+2)×8+2+33)×16=9264) in the evaluation part, and 9540 (4+8+8+256+9264=9540) in total.

The above total of amount of operation is approximately 84% of the amount of operation in RLS. Therefore, the algorithm of the present invention allows operation faster than RLS. Note that the amount of operation in RLS further increases exponentially with increase of the number of elements.

As described above, the reproduction part, the changing part, the exchanging part, the selection part, and the evaluation part in the present invention can perform parallel processing for each of 16 pieces of weight information. In parallel processing, the amounts of operations are: 1 (1×1=1) in the reproduction part; 2 (1×2=2) in the changing part; 1 (1×1=1) in the exchanging part; 16 (1(parity check)×16=16) in the selection part; 579 ((66+2)×8+2+33=579) in the evaluation part; and 599 (1+2+1+16+579=599) in total. Therefore, the algorithm of the present invention allows operation not only faster than RLS, but approximately 2.3 times as fast as LMS.

Figure 21:
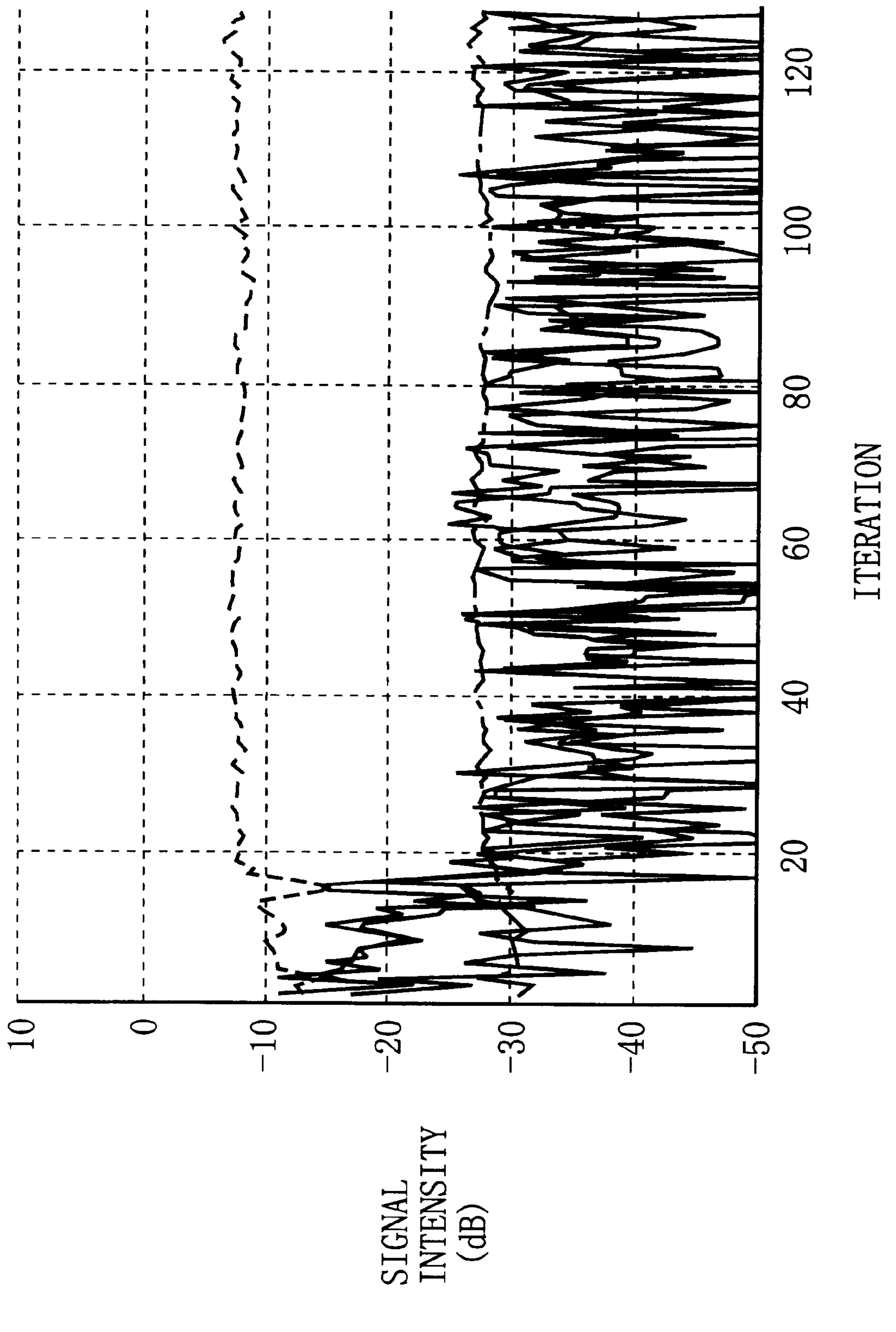
FIG. 21 is a graph showing a convergence rate to solution in the adaptive array antenna using an algorithm of the present invention.
Figure 22:
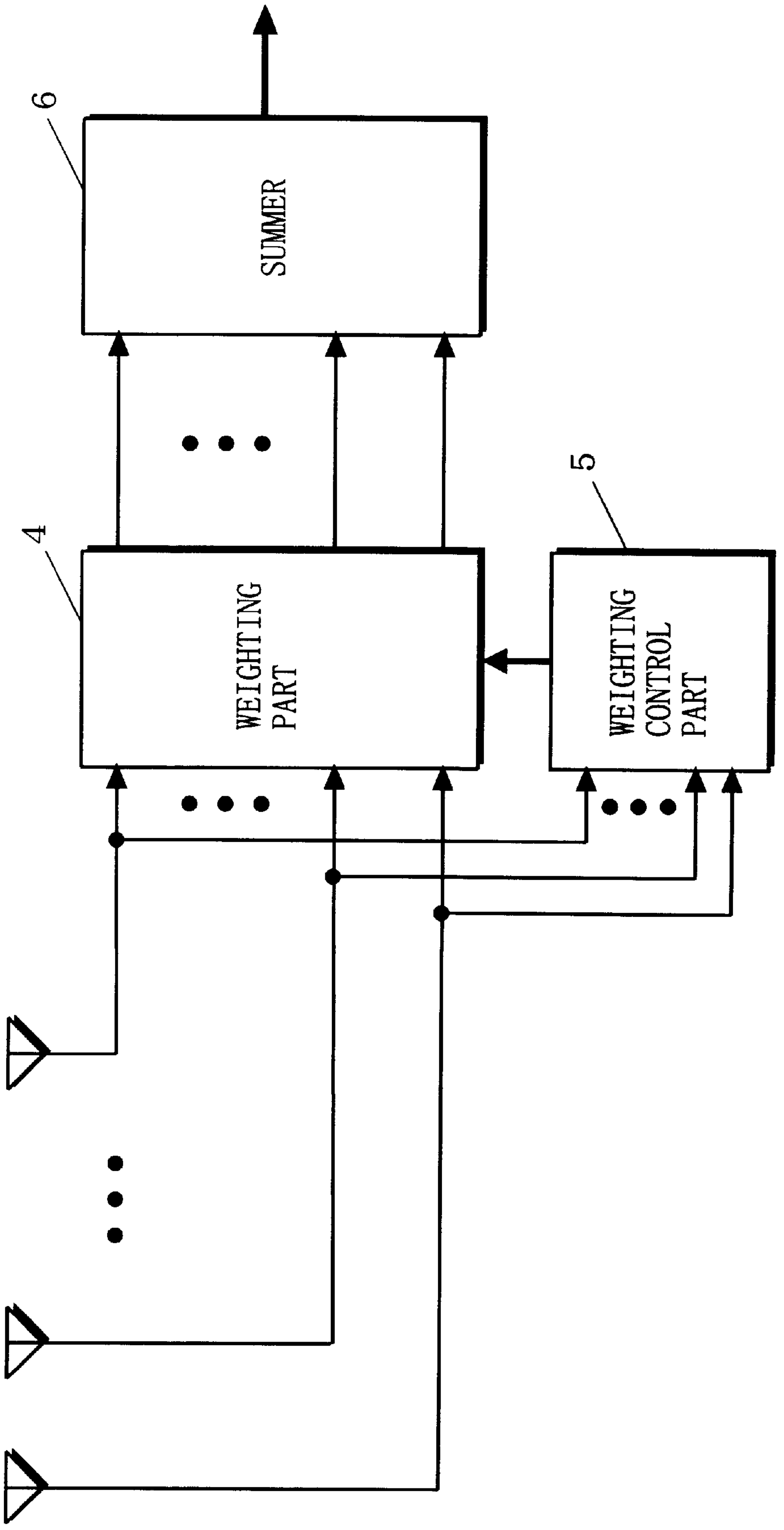
FIG. 22 PRIOR ART
FIG. 22 is a block diagram showing the structure of a conventional adaptive array antenna.
Figure 23:
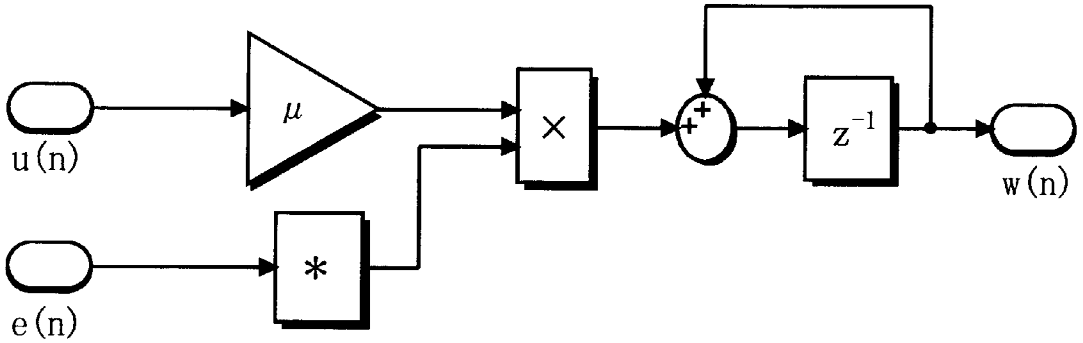
FIG. 23 PRIOR ART
FIG. 23 is a block diagram showing the structure for realizing operation of an LMS algorithm in the conventional adaptive array antenna.
Figure 24:
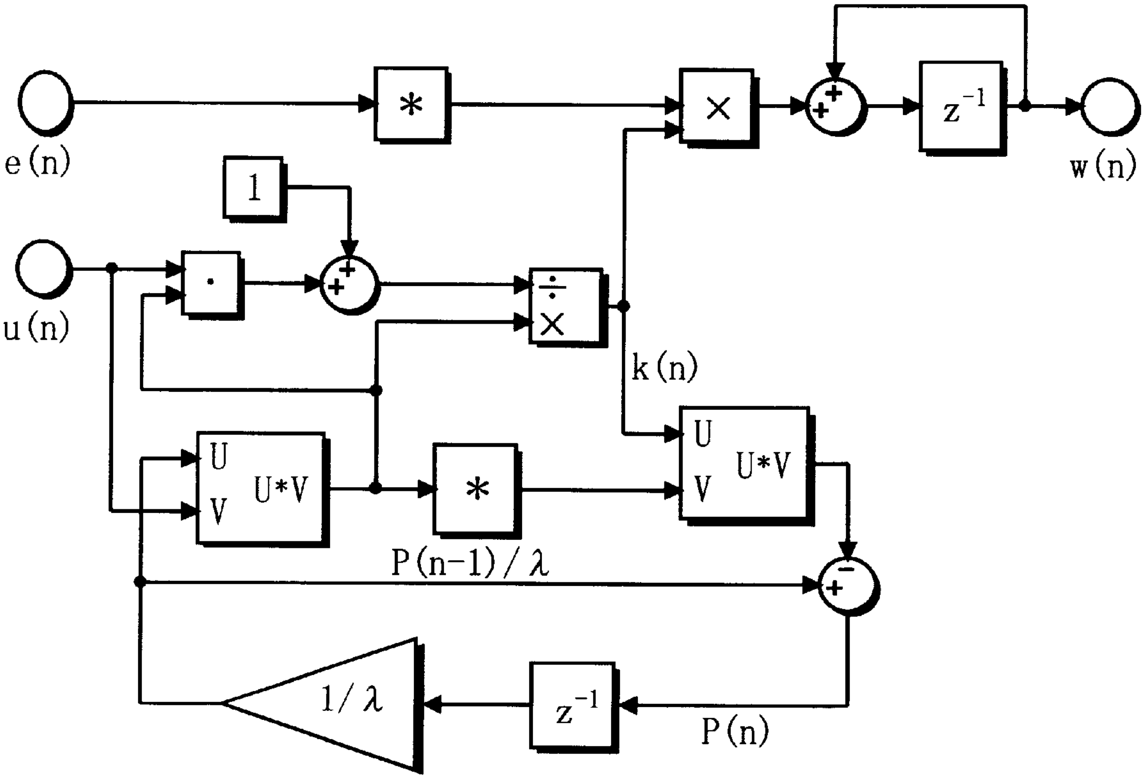
FIG. 24 PRIOR ART
FIG. 24 is a block diagram showing the structure for realizing operation of an RLS algorithm in the conventional adaptive array antenna.
Figure 25:
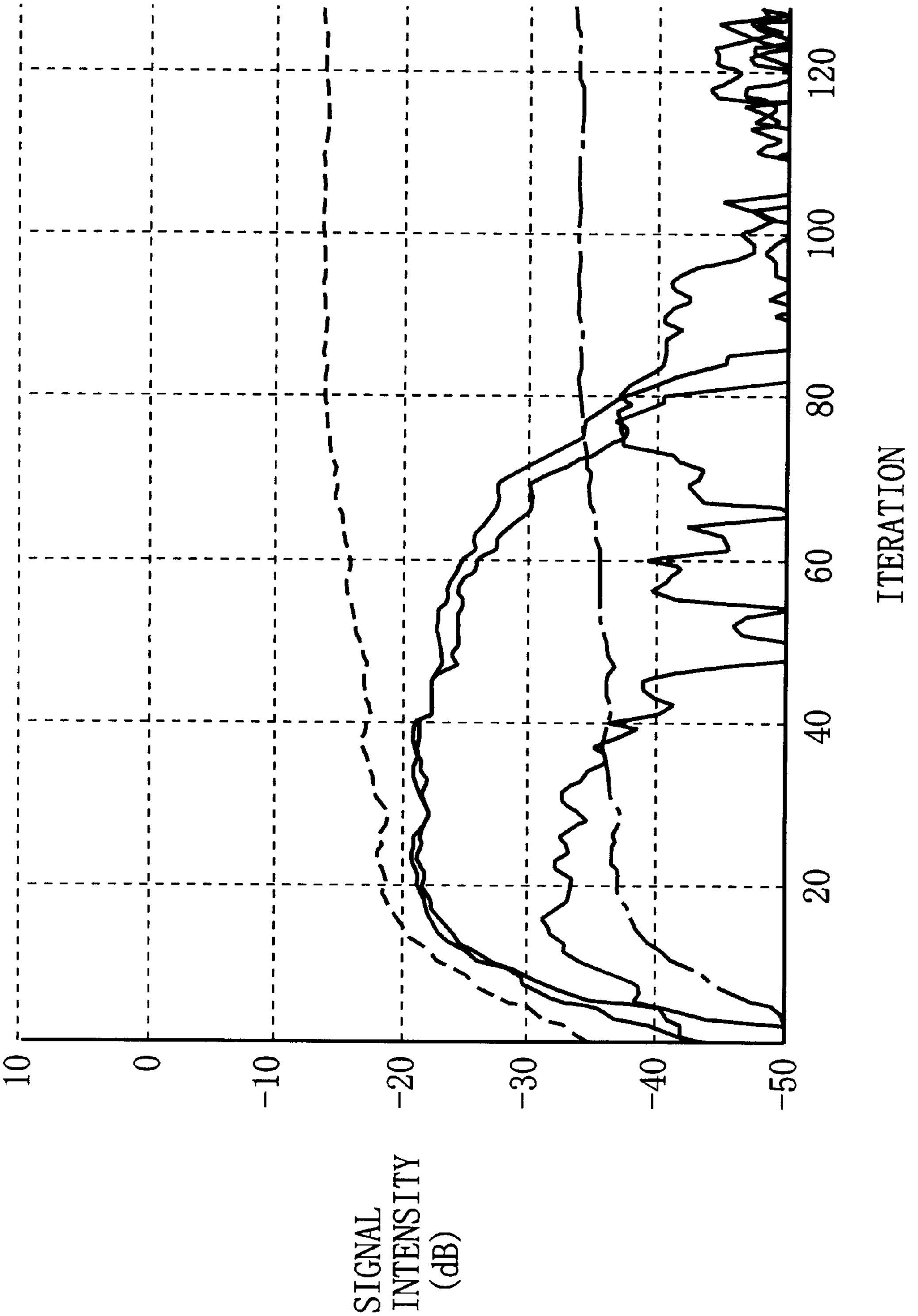
F I G. 2 5 PRIOR ART
FIG. 25 is a graph showing a convergence rate to solution in the conventional adaptive array antenna using the LMS algorithm.

Further, the algorithm of the present invention allows convergence to solution faster than LMS. FIG. 21 is a graph of convergence rates to solution in the adaptive array antenna using the algorithm of the present invention. As in FIG. 25, a dotted line represents a desired wave, and a one-dot-chain line represents the allowable noise level to the desired wave. Other three lines represent interference waves. Referring to FIG. 21, with approximately 20 iterations or more, all interference levels become at the noise level to the desired wave or less. Therefore, according to FIG. 25, the algorithm of the present invention can bring solution into convergence approximately 3.75 times as fast as LMS.

(Application of First Embodiment)

Since the adaptive array antenna as described above can be applied to adaptive filers, described below are exemplary applications of the adaptive array antenna.

Figure 26:
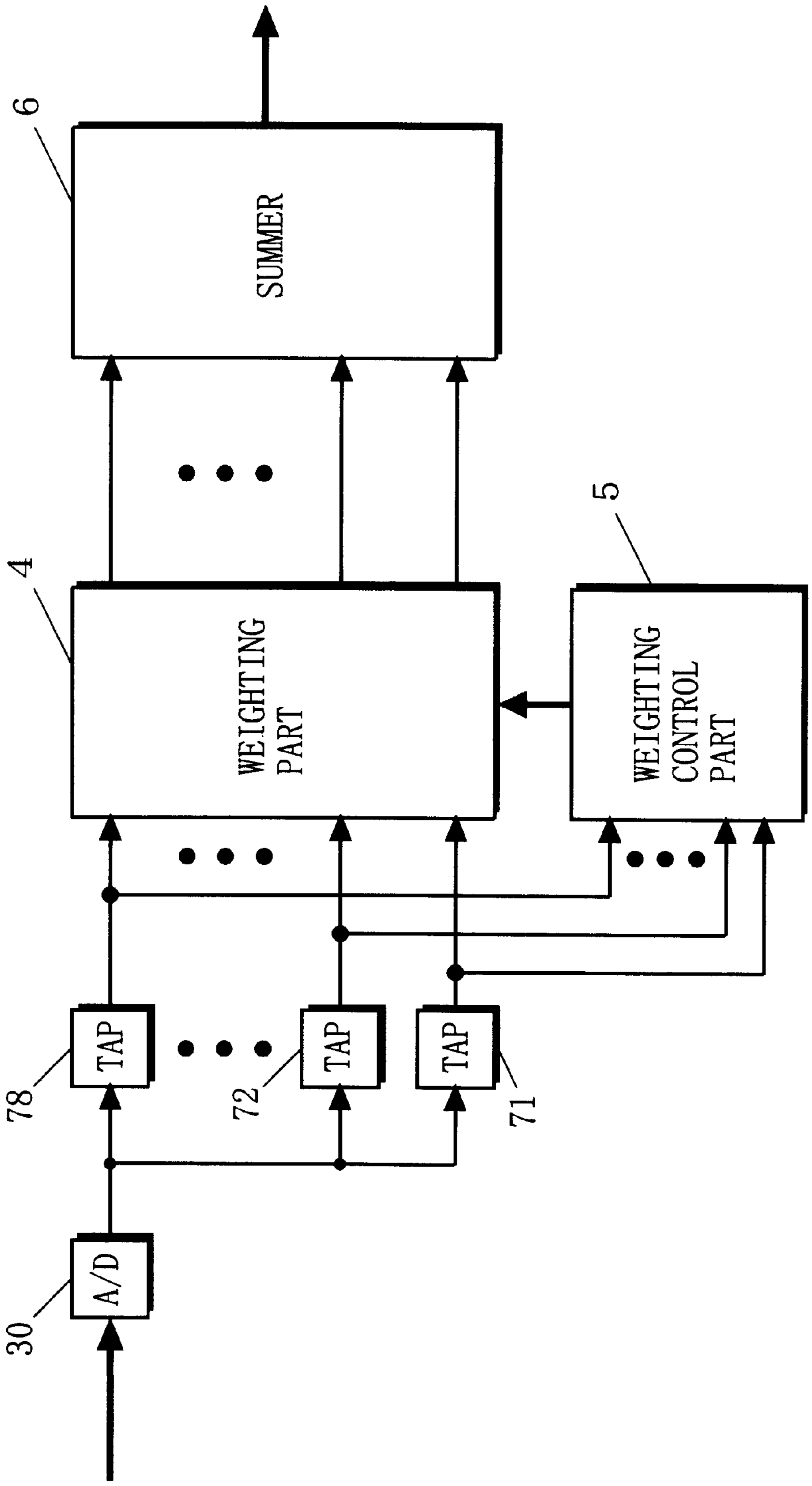
FIG. 26 is a schematic diagram showing the structure of an adaptive filter to which the adaptive array antenna according to one embodiment of the present invention is applied.

Referring to FIG. 26, described is an 8-tap adaptive filter to which the first embodiment is applied. Note that signals received by the adaptive array antenna of the present invention are modulated/demodulated with QPSK or octonary PSK. The signal point coordinates at transmission in QPSK can be illustrated in FIG. 2, while those in octonary PSK in FIG. 3. In FIGS. 2 and 3, black marks represent signal points, the vertical axis represents the real component, and the lateral axis represents the imaginary component.

In FIG. 26, the adaptive filter includes an A/D converter 30 for converting an inputted analog signal into a digital signal and outputting the digital signal, taps 71 to 78 for receiving the signal from the A/D converter 30 and producing eight signals corresponding to the 8-tap adaptive filter, a weighting part 4 for applying a predetermined weight to eight signals from the taps 71 to 78, a weighting control part 5 for providing the weight applied in the weighting part 4, and a summer 6 for combining 8 signals from the weighting control part 5.

As described above, the adaptive filter to which the first embodiment is applied is structured so as to weight signals from eight taps 71 to 78. The number of taps, however, is not restricted to eight as long as it is two or more, and the arrangement of the array elements may take another form.

Described next is operation of the adaptive filter. Signals are supplied to the A/D converter 30. The A/D converter 30 converts the supplied analog signal into a digital signal and outputs the digital signal. Each outputted signal is supplied to the taps 71 to 78. The taps 71 to 78 outputs tap outputs corresponding 8-tap adaptive array filter as sample data.

The sample data is supplied to the weighting part 4 and the weighting control part 5. The weighting control part 5 is provided with the sample data to calculate tap coefficients so as to receive only a desired wave. The calculated eight tap coefficients are collected as one set of tap information and supplied to the weighting part 4. Thus, the weight information referred herein is a data set including a plurality of element weights.

The weighting part 4 weights the inputted sample data using eight tap coefficients included in the tap information. The weighted signals are all combined by the summer 6, and outputted therefrom.

Referring to FIG. 4, operation of the weighting part 4 and the summer 6 is now described in detail. The weighting part 4 includes eight multipliers 401 to 408 and eight element weight parts 411 to 418. Each of the eight element weight parts 411 to 418 is provided with the tap information, and outputs the tap coefficient corresponding to each sample data. Each of the eight multipliers 401 to 408 multiplies the corresponding sample data by the tap coefficient supplied from the corresponding element weight part. The summer 6 combines eight values obtained by multiplication, and the obtained value is outputted as an arithmetic result for one sample. This operation is herein called filter operation.

In the exemplary application of the first embodiment, 16 pieces of tap information are provided. Each tap information includes 8 tap coefficients. Such tap information can be represented as T[k][m], where k is the tap information number, which is a natural number of 16 or less; and m is the tap number, which is a natural number of 8 or less.

FIG. 5 is a block diagram showing the detailed structure of the weighting control part 5. The weighting control part 5 includes: a buffer 107 for receiving eight signals; an evaluation part 101 for receiving signals from the buffer 107 and calculating optimal weights to receive a desired signal; a selection part 102 for selecting possible weights with a high evaluation value; a reproduction part 103 for copying the values supplied by the selection part 102, an exchanging part 104 for exchanging part of the values supplied by the selection part 102; a changing part 105 for changing part of the values supplied by the selection part 102; an information storage part 100 for storing values calculated by the reproduction part 103, the exchanging part 104, and the changing part 105; and a determination part 106 for calculating weights from the values supplied by the selection part 102.

Referring to FIG. 6, operation of the weighting control part 5 is now described. Note that in FIG. 6 and thereafter, the tap information number is substituted for the weight information number, the tap information is for the weight information, the tap coefficient is for the element weight, and the tap number is for the element number. In step S100, the information storage part 100 keeps a wait state until a load signal showing that a receive signal is detected is supplied thereto. The load signal is outputted by a timing detector (not shown) when a receive signal is detected.

When the load signal showing a receive signal is detected is supplied, the information storage part 100 inputs initial values to the tap information (step S200). Although the initial value may be 0, it is preferred that the tap information be as shown in FIG. 7, previously calculated so as to have 16 different phase shifts. With such tap information, search can be started from nearly optimum solutions, allowing reduction in search iterations and, as a result, reduction in the amount of operation.

In a case of a plurality of transmitting terminals, the information storage part 100 may be provided with the terminal number of the transmitting terminal which is about to transmit as a load signal (step S100). In such configuration, the timing detector (not shown) detects the transmitting terminal which is about to transmit from among the plurality of transmitting terminals managed in predetermined timing. The timing detector produces a load signal of the detected terminal number.

Supplied with the load signal, the information storage part 100 supplies the initial values to the tap information (step S200). The initial values to be supplied are preferably the tap information for previous transmission stored for each terminal number. With such tap information, search can be started from previous nearly-optimum solutions even when the transmitting terminal is changed, thereby allowing reduction in search iterations and, as a result, in the amount of operation.

In step S300, the buffer 107 samples eight signals supplied from the taps eight times as fast as the symbol rate. The buffer 107 stores sample data for previous 40 pieces. The stored sample data is represented by S[n], where n is the sample number, which is a natural number of 40 or less.

In step S400, the determination part 106 substitutes 0 into a variable Count for counting the number of processings in steps S500 and thereafter, and the procedure advances to subroutine step S500.

FIG. 8 is a flow chart showing processing in subroutine step S500 (evaluation) in detail. Referring to FIG. 8, operation of the evaluation part 101 in QPSK is now described. As described above, signal point coordinates at transmission is shown in FIG. 2.

In step S510, the evaluation part 101 is provided with data from the buffer 107 and the information storage part 100, and performs operation given by $$P[k]=\sum_{n=1}^{32}\left(\left|\sum_{m=1}^{8}(S[n+m-1]\times T[k][m])\right|-1\right)^2 \tag{8}$$

As the above equation (8), the evaluation part 101 first multiplies the sample data by the tap information T[k][m] stored in the information storage part 100. The multiplication is the above described filter operation shown in FIG. 4.

Next, in step S520, the evaluation part 101 generates an absolute value of the arithmetic result in the above filter operation. The absolute value represents a distance from the origin of a signal point. The evaluation part 101 finds the squared error (squared difference) between the generated absolute value and 1 representing a certain amplitude. The evaluation part 101 combines all evaluation values, and ends the operation. The evaluation value can be represented by P[k], where k is the tap information number, as described above.

In this way, with constant amplitude of the modulated signal in QPSK, the evaluation part 101 calculates a shift of the amplitude value of the sample data from a predetermined amplitude value as an evaluation value. The evaluation value is calculated for each of 16 pieces of tap information. Therefore, the evaluation part 101 finds 16 evaluation values.

Referring to FIG. 8, operation of the evaluation part 101 in octonary PSK is described. As described above, signal point coordinates at transmission are shown in FIG. 3.

In step S510, supplied with data from buffer 107 and the information storage part 100, the evaluation part 101 performs operation given by $$I1[k][n]=\left(\left|\mathrm{real}\left(\sum_{m=1}^{8}(S[n+m-1]\times T[k][m])\right)\right|-\cos(\pi/8)\right)^2 \tag{9}$$

$$I2[k][n]=\left(\left|\mathrm{real}\left(\sum_{m=1}^{8}(S[n+m-1]\times T[k][m])\right)\right|-\sin(\pi/8)\right)^2$$

$$Q1[k][n]=\left(\left|\mathrm{imag}\left(\sum_{m=1}^{8}(S[n+m-1]\times T[k][m])\right)\right|-\cos(\pi/8)\right)^2$$

$$Q2[k][n]=\left(\left|\mathrm{imag}\left(\sum_{m=1}^{8}(S[n+m-1]\times T[k][m])\right)\right|-\sin(\pi/8)\right)^2$$

$$P[k]=\sum_{n=1}^{32}((I1[k][n]\times I2[k][n])+(Q1[k][n]\times Q2[k][n]))$$

where real means extraction of the real component, and imag means extraction of the imaginary component.

In the equations (9), the evaluation part 101 performs the above described filter operation as shown in FIG. 4 using S[n] and the tap information stored in the information storage part 100 to generate an arithmetic value.

In step S520, the evaluation part 101 calculates errors between the absolute values of the real and imaginary parts of the arithmetic value and the real and imaginary parts of two signal point coordinates, cos(π/8)+i×sin(π/8) and sin(π/8)+i×cos(π/8) in the first quadrant in octonary PSK.

That is, I1[k][n] represents the squared error between the absolute value of the real part of the arithmetic value of filter operation and the real part of the signal point coordinates cos(π/8)+i×sin(π/8). Q2[k][n] represents the squared error between the absolute value of the imaginary part of the arithmetic value and the imaginary part of the same signal point coordinates.

Similarly, I2[k][n] represents the squared error between the absolute value of the real part of the arithmetic value and the real part of the signal point coordinates sin(π/8)+i×cos(π/8), while Q1[k][n] represents the squared error between the absolute value of the imaginary part of the arithmetic value and the imaginary part of the same signal point coordinates.

P[k] is the evaluation value obtained by multiplying I1[k][n] by I2[k][n] and Q1[k][n] by Q2[k][n], and combining the multiplication results. After each tap information is subjected to such operation in the evaluation part 101, the evaluation processing ends.

Although the operation of the evaluation part 101 in octonary PSK modulation technique is different from that in QPSK in the present embodiment, the operation in octonary PSK may be equal to that in QPSK. That is, with constant amplitude of the modulated signal in octonary PSK, the evaluation part 101 may calculate a shift of the amplitude value of the sample data from a predetermined amplitude value as an evaluation value.

Although the operation of the evaluation part 101 in QPSK is different from that in octonary PSK in the present embodiment, the operation in QPSK may be equal to that in octonary PSK. As shown in FIG. 2, however, only one signal point is found in the first quadrant in QPSK, and its coordinates are given by sin(π/4)+i×cos(π/4).

It is not required for the evaluation part 101 to perform operations using the above equations (9) with k sequentially varied from 1 to 16, because these operations are not related to each other. Therefore, the operations from P[1] to P[16] can be performed in parallel. The conventional technique using LMS or RLS, however, does not basically allow such parallel operation.

FIG. 9 is a block diagram showing the structure allowing the above parallel operation in the evaluation part 101. Referring to FIG. 9, two signals are supplied to the evaluation part 101 and then to arithmetic blocks P[1] to P[16] included in the evaluation part 101. Each arithmetic block calculates its own evaluation value using inputted data, and outputs the same. The outputted signals are combined to be outputted from the evaluation part 101. Such structure allows the evaluation part 101 to perform operation 16 times as fast as serial operation.

After the evaluation processing ends, the weighting control part 5 starts processing in subroutine step S600.

FIG. 10 is a flow chart showing processing in subroutine step S600 (selection)in detail. Referring to FIG. 10, in step S610, the selection part 102 sorts 16 pieces of tap information according to their corresponding evaluation values, the smallest (highest) first.

Next, in step S620, the selection part 102 selects top four, for example, with the smaller (higher) evaluation value, from among the sorted 16 pieces of tap information. The selection part 102 then temporarily stores the selected four, and ends the operation. Note that the number of tap information to be selected is not restricted to four.

After the selection processing ends, the weighting control part 5 starts processing in subroutine step S700.

FIG. 11 is a flow chart showing processing in subroutine step S700 (reproduction) in detail. Referring to FIG. 11, in step S710, the reproduction part 103 arbitrarily selects one from among the four pieces of tap information selected by the selection part 102. The reproduction part 103 then copies the selected tap information to generate new tap information, and stores the same in the information storage part 100 (step S720).

In step S730, the reproduction part 103 determines whether the number of tap information reaches the required one (here, 4). If no, the selection processing ends. Otherwise, the processing returns back to step S710.

After the selection processing ends, the weighting control part 5 starts processing in subroutine step S800.

FIG. 12 is a flow chart showing processing in subroutine step S800 (exchanging) in detail. Referring to FIG. 12, in step S810, the exchanging part 104 combines the 4 pieces of tap information selected by the selection part 102 according to their evaluation values to generate 4 sets of tap information by combining first-ranked and third-ranked tap information; second-ranked and fourth-ranked; third-ranked and second-ranked; and fourth-ranked and first-ranked. The exchanging part 104 then selects one out of 4 sets of tap information.

The exchanging part 104 then selects one or more tap numbers m at random (step S820). The exchanging part 104 exchanges the tap coefficients of the randomly selected tap numbers between the combined two pieces of tap information to generate a new set of tap information. The exchanging part 104 supplies the information storage part 100 with the generated new set of two pieces of tap information to store therein (step S830).

Note that for the tap coefficients to be exchanged in step S830, both of their real and imaginary components may be exchanged or either of them may be exchanged. When either of them is exchanged, it is preferred that the real and imaginary components be alternately selected to be exchanged every time the exchanging part 104 operates. Such arrangement allows high convergence rate to solution for each component.

In step S840, the exchanging part 104 judges whether the number of tap information reaches the required one (here, 4 sets, 8 pieces). If no, the processing returns to step S810. If yes, the exchanging processing ends.

After exchanging processing ends, the weighting control part 5 starts processing in subroutine step S900.

FIG. 13 is a flow chart showing processing in subroutine step S900 (changing) in detail. Referring to FIG. 13, in step S910, the changing part 105 sets the range of random numbers to a certain range, for example, a range A (−0.1 to 0.1, −0.1i to 0.1i) herein.

In step S920, the changing part 105 judges whether solutions are converging in the vicinity of the optimum solution. Specifically, the changing part 105 finds the maximum evaluation value among the 4 pieces of tap information selected by the selection part 102. When the maximum evaluation value is 4 or more, the changing part 105 determines that solutions are not yet converging, and jumps to step S940. Otherwise, the changing part 105 determines that solutions are converging, and proceeds to step S930.

In step S930, the changing part 105 sets the range of random numbers narrower than that in step S910, to a range B (−0.05 to 0.05, −0.05i to 0.05i), for example.

In step S940, the changing part 105 arbitrarily selects one out of the 4 pieces of tap information selected by the selection part 102. The changing part then finds one or more tap numbers m at random (step S950).

In step S960, the changing part 105 randomly generates a change value within the set range B. Furthermore, either the real or imaginary component of the change value may be 0. When either one is 0, the changing part 105 preferably alternately selects the real and imaginary component for each operation to set it to 0.

In step S970, the changing part 105 adds the randomly-generated change value to the tap coefficient corresponding to the tap number m found as described above, taking a resultant value as a new tap coefficient. The changing part 105 causes the information storage part 100 to store the new four pieces of tap information.

In step S980, the changing part 105 determines whether the number of tap information reaches the required one (here, 4). If yes, the processing ends. Otherwise, the processing returns to step S940.

Instead of the above operation, the changing part 105 may perform the following operation. In step S920, the changing part 105 judges whether solutions are converging in the vicinity of the optimum solution according to the number of iterations of operation in each of the information storage part 100, the evaluation part 101, the selection part 102, the reproduction part 103, the exchanging part 104, and the changing part 105. Specifically, the changing part 105 determines that solutions are converging in the vicinity of the optimum solution when the number of iterations of operation in each part is 32 or more, while determines that solutions are not converging when otherwise. In this operation, since not required to calculate the maximum evaluation value, the changing part 105 can have a simple structure.

After the evaluation processing ends, the weighting control part 5 starts processing in step S600.

In FIG. 6, it is herein described that subroutine steps S700 to S900 are sequentially executed. These steps, however, may be simultaneously executed in parallel. As shown in FIG. 5, the reproduction part 103, the exchanging part 104, and the changing part 105 are configured so as to be able to perform parallel processing. Such parallel processing allows operation faster than serial processing.

In step S1000 shown in FIG. 6, the determination part 106 increments the variable Count by 1. Further, in step S1100, the determination part 106 determines whether the variable Count reaches 4. If no, the processing advances to step S1200. Otherwise, the processing returns to step S500.

In step S1200, the determination part 106 extracts the tap information with the second-ranked evaluation value from the four pieces of tap information temporarily stored in the selection part 102. The extracted tap information is supplied to the above described weighting part 4 as the tap information for weighting.

The reason why the tap information with the second-ranked evaluation value is extracted herein is that the tap information with the first-ranked evaluation value may be erroneously obtained due to noise, and if there is a high possibility of such case, the one with the second-ranked evaluation value is thought to be more accurate.

If there is a low possibility of such case, however, the determination part 106 preferably outputs the tap information with the first-ranked evaluation value as the tap information for weighting.

In step S1300, the buffer 107 detects the presence or absence of receive signals. If the receive signal is present, the processing returns to step S300. Otherwise, the processing ends.

(Application of Second Embodiment)

An adaptive filter to which the second embodiment is applied is similarly structured as that to which the first embodiment is applied as shown in FIG. 26. The eight taps 71 to 78 in the array antenna part 10 are, however, set at predetermined equal time intervals. Therefore, the same operation as in the first embodiment is herein omitted, and different operation is now described.

As in the exemplary application of the first embodiment, 16 pieces of tap information are provided also in the exemplary application of second embodiment. Each tap information includes 4 tap coefficients. Such tap information can be represented by T[k][m], where k is the tap information number, which is a natural number of 16 or less; and m is the tap number, which is a natural number of 4 or less.

Since 8 taps are provided, 4 tap coefficients included in each tap information and additional 4 tap coefficients are required for performing operation for evaluation and weighting. Therefore, as shown in FIG. 15, for evaluation and weighting, conjugate complex numbers of the tap coefficients with tap numbers 1 to 4 are calculated as the tap coefficients with tap numbers 8 to 5.

Therefore, although including only 4 tap coefficients, each tap information is assumed to include 8 tap coefficients. For evaluation and weighting, m in the tap information T[k][m] is assumed to be a natural number of 8 or less.

The reason why the conjugate complex numbers of the tap coefficients with the tap numbers 1 to 4 can be taken as those with the tap numbers 8 to 5 is that the taps are arranged symmetrically.

For example, assuming that time at midpoint in the whole time intervals of all taps is the origin, taps provided symmetrically with respect to the origin are positioned with equal time intervals from the origin. Receive signals between these taps are shifted in phase for the same amount with respect to the origin. Therefore, these receive signals have a conjugate complex relation. The conjugate complex relation can also be observed in their corresponding tap coefficients.

Therefore, the above tap information structure can reduce the number of tap coefficients included in each tap information to half of the actual number of taps, allowing a high convergence rate to solution in search with higher accuracy.

In other words, as described later, the time required for convergence to solution in the exchanging part 104 and the changing part 105 becomes longer as the number of tap coefficients becomes more; the less the number of tap coefficients, the higher the convergence rate to solution. In the case such as the exemplary application of the second embodiment in which solution has to be searched in a short period of time, solution accuracy can be improved.

Referring to FIG. 6, operation of the weighting control part 5 is now described. The operation in steps S100 to S700 are the same as that in the exemplary application of the first embodiment. In evaluation processing, however, the conjugate complex numbers of the tap coefficients with the tap numbers 1 to 4 are calculated as described above as the tap coefficients with the tap numbers 8 to 5.

In subroutine step S800, the exchanging part 104 performs the same operation as in the exemplary application of the first embodiment. Instead, the exchanging part 104 may perform the following operation in the exemplary application of the second embodiment.

Referring to FIG. 16, another exchanging operation in subroutine step S800 is now described. In step S850, the exchanging part 104 sets an initial value of a variable J to 1. The exchanging part 104 then randomly selects one piece of tap information other than the tap information with the Jth-ranked evaluation value from among the weight information selected by the selection part 102 (step S860).

In step S870, the exchanging part 104 collects the tap information with the Jth-ranked evaluation value and the tap information selected at random as a set. Furthermore, the exchanging part 104 exchanges the tap coefficients with the tap number J included in the set of tap information to generate a new set of tap information. The generated tap information is stored in the information storage part 100.

The exchanging part 104 then increments J by 1 (step S880). In step S890, the exchanging part 104 judges whether J is more than 4 or not. If no, the processing returns to step S860. Otherwise, the exchanging processing ends.

FIG. 17 is a schematic diagram showing operation of the above described exchanging part 104. In FIG. 17, ? represents the evaluation rank of the tap information randomly selected so that the evaluation ranks are varied from each other in one set of tap information. Double-headed arrows represent operation of exchanging the tap coefficients. Through the operation as shown in FIG. 17, the exchanging part 104 causes the information storage part 100 to store the generated 4 sets, 8 pieces of tap information.

As described above, each tap information includes only 4 tap coefficients in the exemplary application of the second embodiment. Therefore, the above operation of the exchanging part 104 reduces the number of tap coefficients to be exchanged by half of 8 tap coefficients included in the tap information in the exemplary application of the first embodiment. The exchanging part 104 can thus perform operation with a high convergence rate to solution.

The changing part 105 performs similar operation to that in the exemplary application of the first embodiment. Note that in the exemplary application of the second embodiment, each tap information includes only four tap coefficients. Therefore, as described above for the exchanging part 104, the changing part 105 can also perform operation with a high convergence rate to solution, compared to the case where each weight information includes eight element weights.

Since the determination part 106 performs the same operation as in the exemplary application of the first embodiment, its description is omitted.

(Application of Third Embodiment)

Described next is operation of an adaptive filter to which the third embodiment of the present invention is applied. The structure of the adaptive filter to which the third embodiment is applied is similar to that in the exemplary applications of the first and second embodiments, except including 16 taps.

More specifically, the present adaptive filter is partly different from that as shown in FIG. 26, being structured to apply each predetermined weight to 16 signals. Furthermore, the present adaptive filter includes 16 taps, and an A/D converter. Also in the exemplary application of the third embodiment, 16 pieces of tap information are provided, each including 8 tap coefficients.

With 16 taps, however, 8 tap coefficients included in each tap information and additional 8 tap coefficients are required for evaluation and weighting. Therefore, as in the exemplary application of the second embodiment, the complex conjugate numbers of the tap coefficients with tap numbers 1 to 8 are calculated as the tap coefficients with tap numbers 16 to 9 for evaluation and weighting.

Therefore, although actually including only 8 tap coefficients, each tap information is assumed to include 16 tap coefficients for evaluation and weighting. Thus, m in the tap information T[k][m] is assumed to be a natural number of 16 or less for evaluation and weighting.

The reason why the conjugate complex numbers of the tap coefficients with the tap numbers 1 to 8 are taken as the tap coefficients with the tap numbers 16 to 9 is that the taps are positioned symmetrically with respect to the origin, as described in the 8-tap adaptive filter.

Therefore, the above structure of the tap information can reduce the number of tap coefficients included in each tap information to half of the actual number of taps, allowing a high convergence rate to solution in search with higher accuracy, as in the exemplary application of the second embodiment.

The operations of the selection part 102, the reproduction part 103, the exchanging part 104, the changing part 105, and the determination part 106 in the adaptive filter to which the third embodiment is applied are the same as those in the exemplary application of the first embodiment, and their description is omitted herein. However, m in the tap information T[k][m] is assumed to be a natural number of 16 or less for evaluation. Therefore, 16 signals are subjected to the filter operation in the exemplary application of the third embodiment, which is different from the operation in the exemplary application of the first embodiment.

(Application of Fifth Embodiment)

The adaptive filter to which the fifth embodiment of the present invention is applied is structured similarly to that to which the first embodiment is applied as shown in FIG. 26, while the structure of tap information in the present application is different from the applications of the other embodiments. Therefore, description of the same operation as in the exemplary application of the first embodiment is omitted herein, and only the description of different operation is now made.

As in the exemplary application of the first embodiment, 16 pieces of tap information are provided in the present application. Each tap information includes 8 tap coefficients and a rotator R. Therefore, each tap information includes 9 components, which can be represented by T[k][1], T[k][2], . . . T[k][8], R[k], where k is the tap information number, a natural number of 16 or less. Those 9 components included in each tap information are provided with component numbers 1 to 9.

Referring to FIG. 6, operation of the weighting control part 5 is now described. The operations in steps S100 to S400 are the same as those in the exemplary application of the first embodiment. In subroutine step S500, the evaluation part 101 performs operation as follows.

Referring to FIG. 8, described is operation of the evaluation part 101 in octonary PSK. As descried above, the signal point coordinates are illustrated as in FIG. 3.

In step S510, provided with data from the buffer 107 and the information storage part 100, the evaluation part 101 performs arithmetic operation given by $$I1[k][n] = \left( \left| \mathrm{real}\left( \sum_{m=1}^{8} (S[n+m-1] \times T[k][m]) \times R[k] \right) \right| - \cos(\pi/8) \right)^2 \quad (10)$$

$$I2[k][n] = \left( \left| \mathrm{real}\left( \sum_{m=1}^{8} (S[n+m-1] \times T[k][m]) \times R[k] \right) \right| - \sin(\pi/8) \right)^2$$

$$Q1[k][n] = \left( \left| \mathrm{imag}\left( \sum_{m=1}^{8} (S[n+m-1] \times T[k][m]) \times R[k] \right) \right| - \cos(\pi/8) \right)^2$$

$$Q2[k][n] = \left( \left| \mathrm{imag}\left( \sum_{m=1}^{8} (S[n+m-1] \times T[k][m]) \right) \right| - \sin(\pi/8) \right)^2$$

-continued $$P[k] = \sum_{n=1}^{32} ((I1[k][n] \times I2[k][n]) + (Q1[k][n] \times Q2[k][n]))$$

where real represents extraction of the real component, and imag represents extraction of the imaginary component.

As shown in equations (10), the evaluation part 101 performs the above described filter operation with the sample data and the tap information stored in the information storage part 100, and further multiplies the result by the rotator to generate an arithmetic value. In step S520, the evaluation part 101 performs the same operation as that in the exemplary application of the first embodiment.

The operations of the weighting control part 5 in subroutine steps S600 and S700 are the same as those in the exemplary application of the first embodiment. In subroutine step S800, the exchanging part 104 performs the operation as follows, where m in FIGS. 12 and 13 represents the component number instead of the tap number.

Referring to FIG. 12, in step S810, the exchanging part 104 performs the same operation as in the exemplary application of the first embodiment. The exchanging part 104 then selects one or more component numbers at random (step S820). The exchanging part 104 exchanges the tap coefficients or rotators of the component numbers selected at random between the combined two pieces of tap information to generate a new set of tap information. The exchanging part 104 causes the information storage part 100 to store the generated set of two pieces of tap information (step S830).

In step S840, the exchanging part 104 performs the same operation as in the exemplary application of the first embodiment. After exchanging processing ends, the weighting control part 5 starts processing in subroutine step S900.

Referring to FIG. 13, in steps S910 to S940, the changing part 105 performs the same operations as those in the exemplary application of the first embodiment. In step S950, the changing part 105 finds one or more component numbers at random.

In step S960, the changing part 105 randomly generates a change value within a set range of random numbers. In step S970, the changing part 105 adds the change value generated at random to the tap coefficient corresponding to the component number obtained as described above, and takes the resultant value as a new tap coefficient. However, when the obtained component number is 9, that is, the rotator, the change value is first divided by half, and then added to the rotator, and takes the resultant value as a new rotator. The changing part 105 causes the information storage part 100 to store the generated four pieces of tap information. In step S980, the changing part 105 performs the same operation as in the exemplary application of the first embodiment.

Alternatively, the changing part 105 may perform the same operation as in the exemplary application of the first embodiment instead of the above described operation. In step S920, the changing part 105 determines whether solutions are converging in the vicinity of the optimum solution according to the number of iterations of operation in the information storage part 100, the evaluation part 101, the selection part 102, the reproduction part 103, the exchanging part 104, and the changing part 105. Specifically, the changing part 105 determines that solutions are converging in the vicinity of the optimum solution when the number of iterations of operation is 32 or more, and determines otherwise when the number of iterations of operation is less than 32. In such operation, calculation of the maximum evaluation value is not required, thereby allowing a simple structure of the changing part 105.

Referring next to FIG. 6, in steps S1000 and S1100, the determination part 106 performs the same operations as those in the exemplary application of the first embodiment, and therefore their description is omitted herein.

In step S1200, the determination part 106 extracts the tap information with the second-ranked evaluation value from the 4 pieces of tap information temporarily stored in the selection part 102, as described above. The extracted tap information includes 8 tap coefficients and 1 rotator R. The determination part 106 multiplies each of 8 tap coefficients by the rotator. The determination part 106 inputs the resultant values to the weighting part 4 as tap information for weighting.

In this way, the adaptive filter of the fifth embodiment includes the rotator R in the tap information. Multiplication by the rotator R eliminates adjustments to phase rotation by a demodulator (not shown). Further, the rotator R included in the tap information provides 8 tap coefficients with a restriction to phase rotation, allowing them to perform weighting with high accuracy.

(Application of Sixth Embodiment)

An adaptive filter to which the sixth embodiment of the present invention is applied is formed by adding the structure and operation for training to those of the adaptive filter to which the first or second embodiment is applied. Therefore, the adaptive filter to which the sixth embodiment is applied performs the same operation as the adaptive filter to which the first or second embodiment is applied except it performs training for a certain period of time. In the training period, a signal to be transmitted is a signal for training. Described below is the different operation only, with reference to FIG. 6.

In FIG. 6, the operations of the adaptive filter to which the sixth embodiment is applied until step S400 are the same as those of the adaptive filter to which the first or second embodiment is applied. The adaptive filter to which the sixth embodiment is applied performs training during a certain period after start receiving, typically, during a period for receiving first 16 symbols.

In subroutine step S500, the evaluation part 101, which performs training, performs different operation from that in the adaptive filter to which the first or second embodiment is applied. FIG. 20 is a flow chart showing processing in subroutine step S500 in the exemplary application of the sixth embodiment.

Referring to FIG. 20, in step S530, the evaluation part 101 performs the above described filter operation with the tap information and the sample data to generate arithmetic values. Next, in step S540, the evaluation part 101 finds each squared error between each generated value and training data, and takes the sum of the squared errors as the evaluation value of the tap information. Such operation can be represented by $$P[k] = \sum_{n=1}^{32} \left( \mathrm{real}\left( \sum_{m=1}^{8} (S[n+m-1] \times T[k][m]) \right) - \mathrm{real}(D[n]) \right)^2 + \sum_{n=1}^{32} \left( \mathrm{imag}\left( \sum_{m=1}^{8} (S[n+m-1] \times T[k][m]) \right) - \mathrm{imag}(D[n]) \right)^2 \quad (11)$$

where real means extraction of the real component and imag means extraction of the imaginary component.

In the above equation (11), D[n] represents the predetermined training data, and n represents the sample number. The predetermined training data may be data of alternate zeros and ones, or data with different 16 symbols. The signal to be transmitted includes the predetermined training data.

As shown in equation (11), the evaluation part 101 subjects the sample data as shown in FIG. 4 and the tap information stored in the information storage part 100 to the filter operation. The evaluation part 101 finds each squared error (squared difference) between each arithmetic result and the predetermined training data D[n] for each of the real and imaginary components, and combines the resultant values to obtain an evaluation value P[k].

The evaluation value is calculated for each of 16 pieces of tap information. The evaluation part 101 in the exemplary application of the sixth embodiment, therefore, obtains 16 evaluation values, which is the same as in the exemplary application of the first or second embodiment.

The operations of the selection part 102, the reproduction part 103, the exchanging part 104, the changing part 105, and the determination part 106 of the adaptive filter to which the sixth embodiment is applied in subroutine steps S600 to S1200 are the same as those of the adaptive filter to which the first embodiment is applied, and therefore their description is omitted herein. Furthermore, the adaptive filter to which the sixth embodiment is applied omits the operation in step S1300.

The buffer 107 is required to perform four storing operations to store 16 symbols of data. After four operations, the present adaptive filter ends training operation.

After the training operation, the present adaptive filter performs the same operations as those of the adaptive filter to which the first or second embodiment is applied. Therefore, the present adaptive filter to which the sixth embodiment is applied is characterized as performing the same operations as those in the adaptive filter to which the first or second embodiment is applied and further performing training.

Furthermore, the present adaptive filter may be structured by the adaptive filter to which the third or fourth embodiment is applied with training operation. The tap number m, however, is an integer of 1 to 16 according to the number of taps.

Still further, the present adaptive filter may be structured by the adaptive filter to which the fifth embodiment is applied with training operation. Each value obtained by filter operation, however, has to be multiplied by the rotator R. Such multiplication is represented by $$P[k] = \sum_{n=1}^{32}\left(\mathrm{real}\left(\sum_{m=1}^{8}(S[n+m-1]\times T[k][m])\times R[k]\right)-\mathrm{real}(D[n])\right)^2 + \sum_{n=1}^{32}\left(\mathrm{imag}\left(\sum_{m=1}^{8}(S[n+m-1]\times T[k][m])\times R[k]\right)-\mathrm{imag}(D[n])\right)^2 \quad (12)$$

Such training operation can bring the signal points of the sample data into convergence only to the predetermined coordinates of the signal points for training. Therefore, the tap coefficients with which a desired signal can be accurately separated can be obtained.

The adaptive filters to which the above first to third, fifth, and sixth embodiments are applied using a so-called genetic algorithm have an advantage, despite relatively large amount of operation, over the conventional adaptive filter using LMS in a high convergence rate to solution, allowing adaptive control with high accuracy.

While the invention has been described in detail, the foregoing description is in all aspects illustrative and not restrictive. It is understood that numerous other modifications and variations can be devised without departing from the scope of the invention.

What is claimed is:

1. An adaptive array antenna for varying directivity by weighting receive signals so as to remove an undesired signal from the receive signals, comprising a plurality of array antenna elements for receiving signals;

a weighting control part for receiving the signals from said plurality of array antenna elements, and calculating weight information including a plurality of element weights for use in weighting the receive signals so as to remove the undesired signal;

a weighting part for receiving said weight information from said weighting control part, and weighting the signals from said plurality of array antenna elements; and a summer for combining all signals from said weighting part;

said weighting control part comprising:

a buffer for storing sample data obtained by sampling the signals from said plurality of array antenna elements;

an evaluation part for performing array combining operation by multiplying said sample data by each of a plurality of possible weight information for each component corresponding to each of said array antenna elements and combining multiplication results, and for calculating an evaluation value representing a degree of removal of the undesired signal by the possible weight information from each of combined results;

a selection part for selecting some of the plurality pieces of possible weight information in order of decreasing degree of evaluation;

an exchanging part for exchanging one or more element weights included the selected plurality pieces of possible weight information to generate new possible weight information;

a changing part for changing one or more element weights included in the selected plurality pieces of possible weight information with a random number to generate new possible weight information;

a reproduction part for copying the selected weight information to generate new possible weight information;

an information storage part for storing the possible weight information generated by said exchanging part, said changing part, and said reproduction part, and supplying the possible weight information to said evaluation part; and a determination part for calculating said weight information from the possible weight information with a most effective evaluation value among the selected possible weight information; wherein of said plurality pieces of possible weight information, only the plurality pieces of possible weight information with which the undesired signal can be removed more effectively are selected, exchanged, changed, reproduced, and reevaluated repeatedly for a predetermined number of times so as to be renewed from an initial state, and then only the possible weight information with which the undesired signal can be removed most effectively is determined as said weight information by said determination part.

2. The adaptive array antenna according to claim 1, wherein said information storage part has the plurality pieces of possible weight information each of which is predetermined to have different directivities in the initial state, and supplies the plurality pieces of possible weight information to said evaluation part before the receive signals are supplied.

3. The adaptive array antenna according to claim 1, wherein said information storage part stores said weight information previously used corresponding to each of a plurality of transmitting stations, and when the transmitting station is changed, loads said weight information stored therein corresponding to the transmitting station at present as new possible weight information.

4. The adaptive array antenna according to claim 1, wherein said array antenna elements are structured by combining a plurality of sets of two array antenna elements arranged symmetrically in line with respect to a predetermined origin;

said information storage part, said selection part, said exchanging part, said changing part, and said reproduction part use the possible weight information including only the element weights corresponding to one of said two array antenna elements in the set, and said evaluation part and said determination part use the possible weight information including all values obtained by multiplying every X-coordinate value by every Y-coordinate value, said X-coordinate and Y-coordinate values arbitrarily selected from the values of said plurality of X-coordinates and Y-coordinates and the corresponding plurality of X-coordinates and Y-coordinates having the conjugate complex relation therewith so that combinations of said X-coordinate and Y-coordinate values vary one another, as the element weights.

5. The adaptive array antenna according to claim 1, wherein each of said array antenna elements is arranged on coordinates of a combination of any of a plurality of X-coordinates and Y-coordinates on an X-axis and a Y-axis orthogonal to each other at a predetermined origin and a corresponding plurality of X-coordinates and Y coordinates having a conjugate complex relation therewith, said information storage part, said selection part, said exchanging part, said changing part, and said reproduction part use the possible weight information including only values of the plurality of X-coordinates and Y-coordinates on said X-axis and said Y-axis as the element weights, and said evaluation part and said determination part uses the possible weight information including all values obtained by multiplying every X-coordinate value by every Y-coordinate value, said X-coordinate and Y-coordinate values arbitrarily selected from the values of said plurality of X-coordinates and Y-coordinates and the corresponding plurality of X-coordinates and Y-coordinates having the conjugate complex relation therewith so that combinations of said X-coordinate and Y-coordinate values vary one another, as the element weights.

6. The adaptive array antenna according to claim 1, wherein said changing part adds a random number generated in a predetermined range to one or more element weights included in the selected plurality of pieces of weight information, and generates new possible weight information.

7. The adaptive array antenna according to claim 6, wherein said changing part changes the range of random numbers to be generated under predetermined condition.

8. The adaptive array antenna according to claim 7, wherein said changing part changes the range of random numbers to be narrower as said evaluation value is higher, and to be broader as said evaluation value is lower.

9. The adaptive array antenna according to claim 7, wherein, said changing part changes the range of random numbers so as to be narrower as the number of operations by said information storage part, said evaluation part, said selection part, said exchanging part, said changing part, and said reproduction part is larger, and to be broader as the number of operation is smaller.

10. The adaptive array antenna according to claim 1, wherein said evaluation part finds a squared error between a distance from signal point coordinates calculated from the result of said array combining operation to an origin and a predetermined value, and calculates a higher evaluation value as the squared error is lower.

11. The adaptive array antenna according to claim 1, wherein said evaluation part finds a distance between signal point coordinates calculated from the result of said array combining operation and signal point coordinates at transmission, and calculates a higher evaluation value as the distance is shorter.

12. The adaptive array antenna according to claim 1, wherein said evaluation part has signal point coordinates for training in advance, finds a distance between signal point coordinates calculated from the result of said array combining operation and the signal point coordinates for training, and calculates a higher evaluation value as the distance is shorter.

13. The adaptive array antenna according to claim 11, wherein said evaluation part finds a distance between signal point coordinates in which real and imaginary components of the signal point coordinates calculated from the result of said array combining operation are taken as positive and signal point coordinates in a first quadrant at transmission, and calculates a higher evaluation value as the distance is shorter.

14. The adaptive array antenna according to claim 13, wherein when a plurality of signal point coordinates are present in the first quadrant at transmission, said evaluation part finds each squared error between an absolute value of the real component of the signal point coordinates calculated from the result of said array combining operation and each of the real component of said plurality of signal point coordinates, and multiplies all squared errors; finds each squared error between an absolute value of the imaginary component of the signal point coordinates calculated from the result of said array combining operation and each of the imaginary component of said plurality of signal point coordinates; multiplies all squared errors; and calculates a higher evaluation value as a value obtained by combining the multiplied squared errors is smaller.

15. The adaptive array antenna according to claim 1, wherein, said evaluation part performs the array combining operation for each of plurality of pieces of sample data with different sample timings, and calculates the evaluation value by combining a plurality of results of the array combining operation.

16. The adaptive array antenna according to claim 1, wherein said determination part calculates said weight information from the possible weight information with a second-highest evaluation value among the selected plurality of pieces of possible weight information.

17. The adaptive array antenna according to claim 1, wherein said exchanging part fixes the element weights to be exchanged to values corresponding to any predetermined one of the antenna elements.

18. The adaptive array antenna according to claim 1, wherein said exchanging part determines the element weights to be exchanged at random.

19. The adaptive array antenna according to claim 1, wherein said exchanging part fixes ranks of the evaluation values corresponding to the weight information including the element weights to be exchanged to a predetermined set of the ranks.

20. The adaptive array antenna according to claim 1, wherein said exchanging part randomly determines ranks of the evaluation values corresponding to the weight information including the element weights to be exchanged.

21. The adaptive array antenna according to claim 1, wherein said exchanging part exchanges either real components or imaginary components of the element weights.

22. The adaptive array antenna according to claim 1, wherein said changing part changes either real components or imaginary components of the element weights with a random number.

23. The adaptive array antenna according to claim 1, wherein said evaluation part calculates the evaluation values of the plurality of pieces of possible weight information in parallel operation.

24. The adaptive array antenna according to claim 1, wherein said weight information includes the plurality of element weights corresponding to said array antenna elements and further a rotator for providing a restriction to phase rotation for the plurality of element weights as the element weight, and the evaluation part performs the array combining operation by multiplying said sample data by the possible weight information for each component corresponding to each of said array antenna elements, then multiplying each of multiplication results by the rotator and combining multiplication results.

* * * * *